(12) United States Patent
Blitz et al.

(10) Patent No.: US 8,943,817 B2
(45) Date of Patent: Feb. 3, 2015

(54) NON-LINEAR ACTUATOR SYSTEM AND METHOD

(75) Inventors: Jonathan N. Blitz, Durham, NC (US);
Peter Childers, Palo Alto, CA (US);
James Carucci, New Hartford, NY (US); Ronald Draper, Poland, NY (US)

(73) Assignee: CBE Global Holdings, Inc., Palo Alto, CA (US)

( * ) Notice: Subject to any disclaimer, the term of this patent is extended or adjusted under 35 U.S.C. 154(b) by 1247 days.

(21) Appl. No.: 12/656,365

(22) Filed: Jan. 27, 2010

(65) Prior Publication Data

US 2010/0319341 A1 Dec. 23, 2010

Related U.S. Application Data

(63) Continuation-in-part of application No. PCT/US2009/000825, filed on Feb. 10, 2009, which is a continuation-in-part of application No. PCT/US2008/006660, filed on May 23, 2008.

(60) Provisional application No. 61/213,596, filed on Jun. 23, 2009, provisional application No. 61/136,964, filed on Oct. 17, 2008, provisional application No. 61/064,351, filed on Feb. 29, 2008.

(51) Int. Cl.
| | |
|---|---|
| *H02S 20/00* | (2014.01) |
| *F15B 15/12* | (2006.01) |
| *F15B 13/042* | (2006.01) |
| *F15B 15/10* | (2006.01) |

(52) U.S. Cl.
CPC ............ *F15B 13/042* (2013.01); *F15B 15/10* (2013.01); *F15B 15/12* (2013.01); *F15B 15/125* (2013.01)
USPC ............................................. 60/398; 92/98 D

(58) Field of Classification Search
USPC ........................... 92/98 D; 91/363 R; 60/398
See application file for complete search history.

(56) References Cited

U.S. PATENT DOCUMENTS 3,051,143 A * 8/1962 Nee ................................ 92/98 D
3,070,075 A * 12/1962 Hanselmann ................... 92/120

(Continued)

FOREIGN PATENT DOCUMENTS

| | | |
|---|---|---|
| DE | 10022236 A1 * | 11/2001 |
| JP | 2003-324210 | 11/2003 |
| KR | 10-20070044333 | 4/2007 |

OTHER PUBLICATIONS

International Search Report issued in PCT/US2009/000825, mailed on Sep. 16, 2009.

*Primary Examiner* — F. Daniel Lopez
(74) *Attorney, Agent, or Firm* — Andrews Kurth LLP; Aldo Noto; Matthew J. Esserman

(57) ABSTRACT

An embodiment of a system and method for moving an object in one axis includes one or more fluid inflatable containers which are arranged to transmit fluid pressure to a plunger, such that a flexible membrane of the fluid inflatable container engages with the plunger and forms a rolling lobe in response to changes in volume. The fluid inflatable containers are enclosed within an enclosure or drum, and a shaft runs axially through the center of the enclosure. The system further includes one or more control valves operably connected to the one or more fluid inflatable containers for controlling the volume of fluid in the one or more containers. By changing the volume of fluid in the one or more containers the object is moved. In an embodiment an arced plunger is used to assist in creating the rolling lobe.

15 Claims, 17 Drawing Sheets

(56) References Cited

U.S. PATENT DOCUMENTS

| | | | |
|---|---|---|---|
| 3,137,214 A * | 6/1964 | Feld et al. | 92/98 D |
| 3,839,945 A * | 10/1974 | Jacobellis | 92/90 |
| 3,977,648 A | 8/1976 | Sigmon | |
| 3,985,118 A | 10/1976 | Bard | |
| 4,557,182 A * | 12/1985 | Mount | 92/98 R |
| 4,575,027 A | 3/1986 | Cronin | |
| 4,586,488 A | 5/1986 | Noto | |
| 4,878,417 A * | 11/1989 | Facon | 91/363 R |
| 5,103,551 A | 4/1992 | Tamura et al. | |
| 5,634,334 A * | 6/1997 | Hehl | 91/363 R |
| 5,911,362 A | 6/1999 | Wood et al. | |
| 6,058,930 A | 5/2000 | Shingleton | |
| 6,070,513 A | 6/2000 | MacDonald | |
| 7,093,528 B2 * | 8/2006 | McFarland | 92/138 |
| 2002/0190068 A1 | 12/2002 | Sisk et al. | |
| 2006/0112685 A1 | 6/2006 | Devier et al. | |
| 2008/0143280 A1 | 6/2008 | Rock | |
| 2009/0211160 A1 | 8/2009 | Tehranchi | |

* cited by examiner

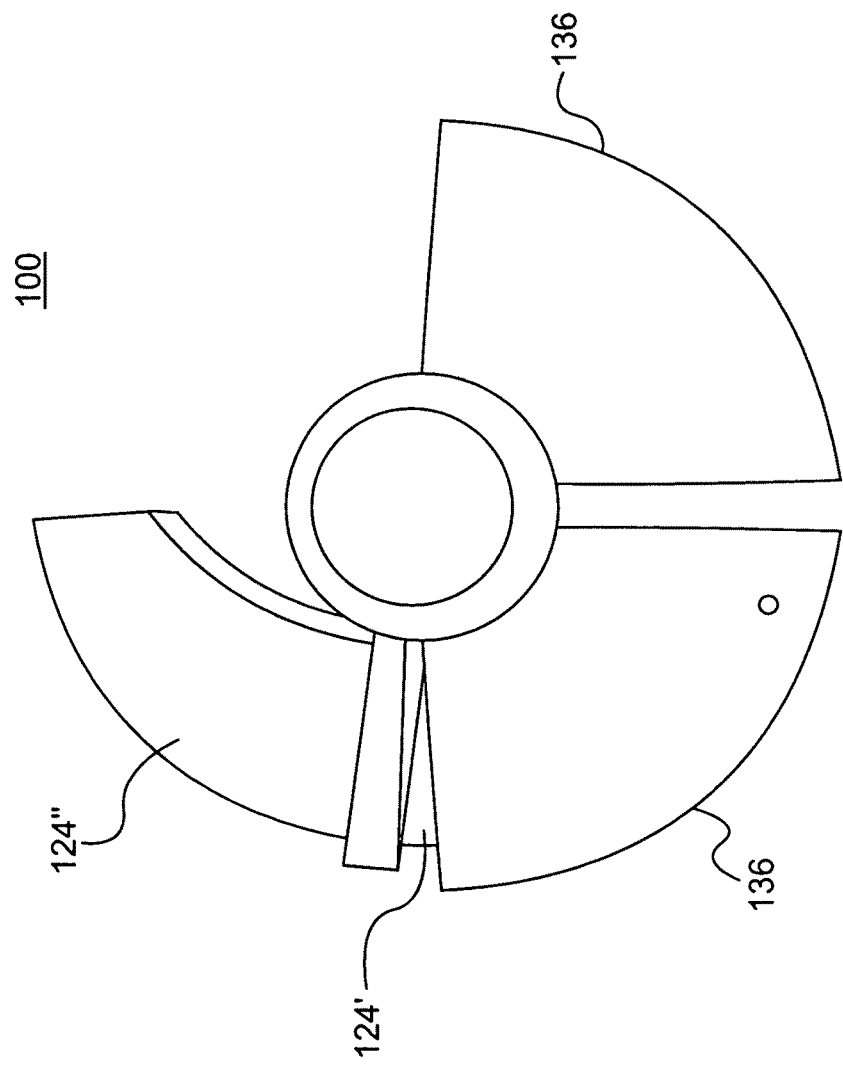

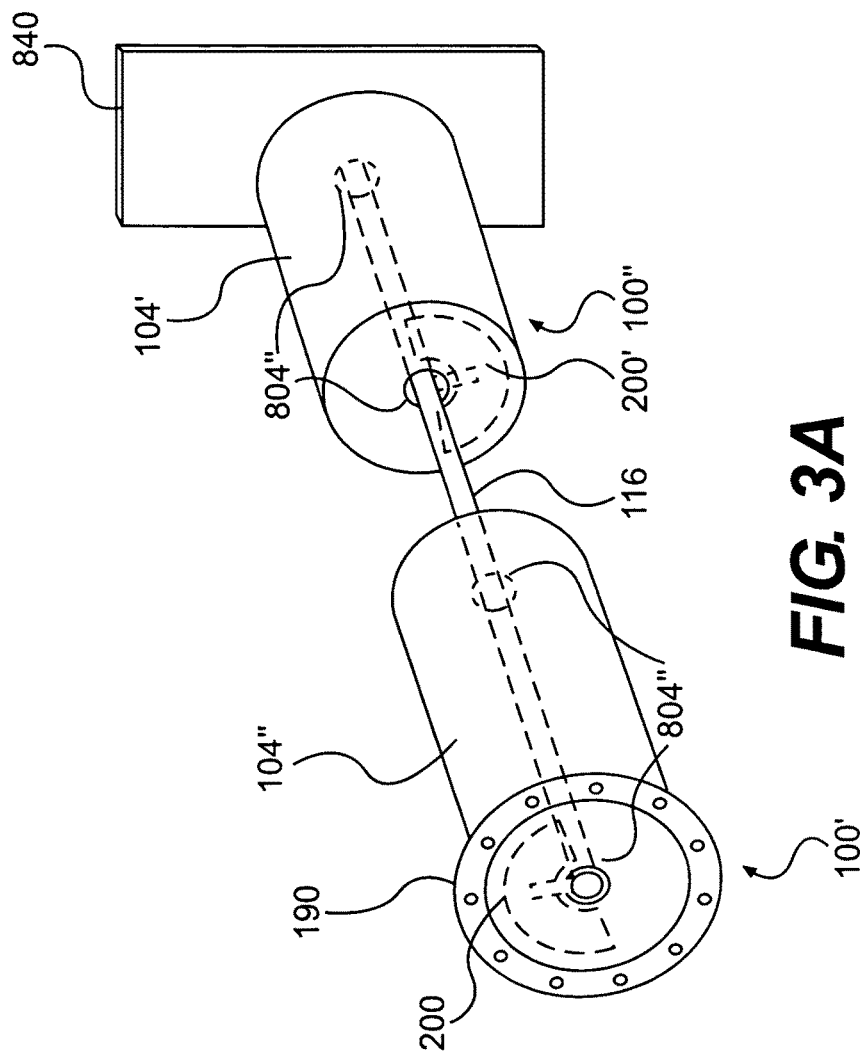

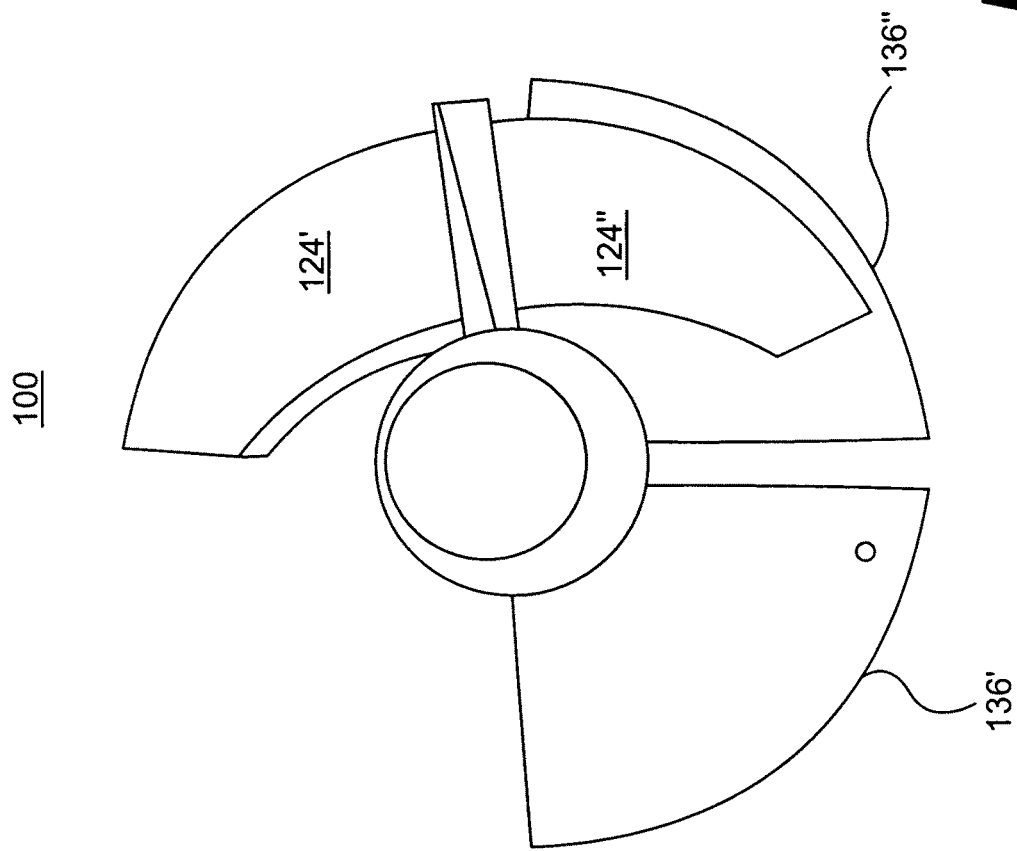

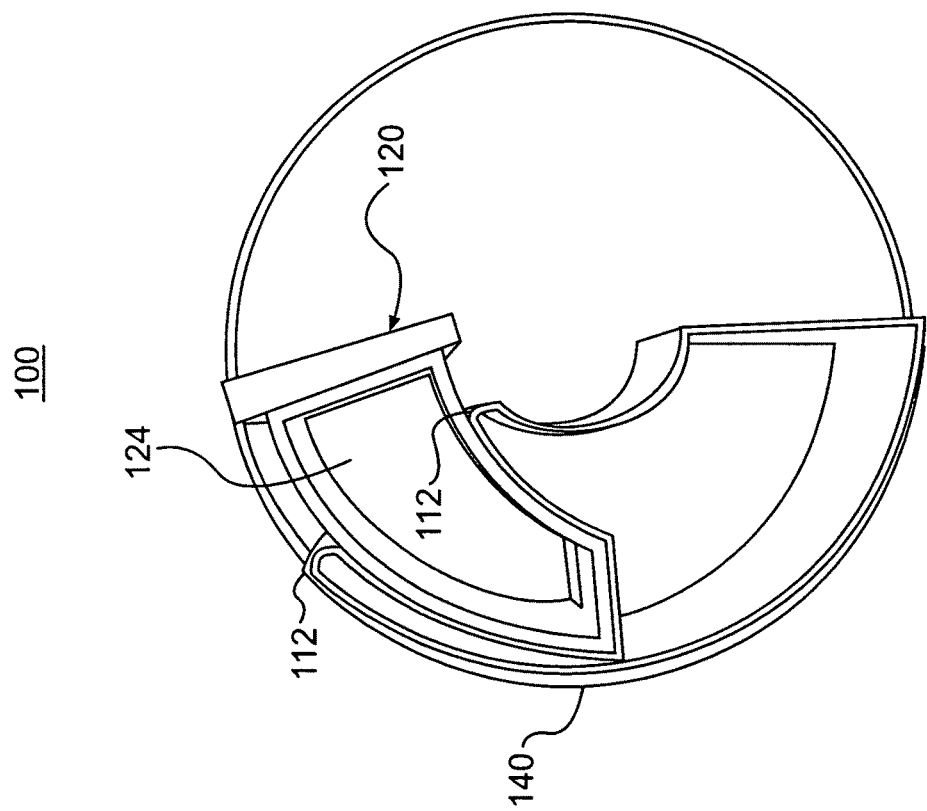

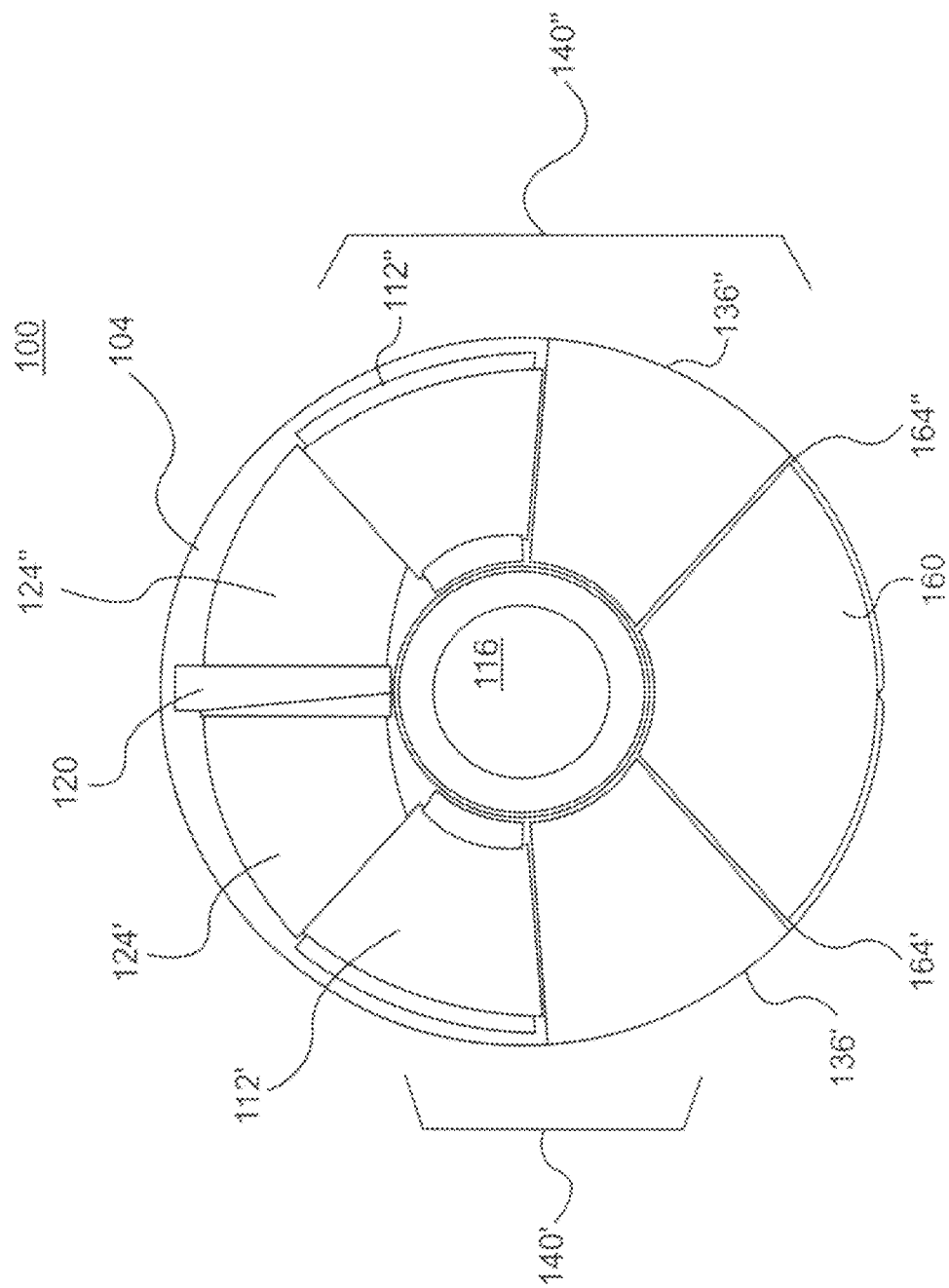

NON-LINEAR ACTUATOR SYSTEM AND METHOD

RELATED APPLICATIONS

The present application incorporates by reference and claims the priority of U.S. Provisional Application No. 61/213,596, entitled "Non-Linear Actuator System And Method," filed Jun. 23, 2009, International PCT Application No. PCT/US2009/000825, entitled "Single-Axis Drive System and Method," filed Feb. 10, 2009, claiming priority to U.S. Provisional Application No. 61/064,351, filed Feb. 29, 2008 and U.S. Provisional Application No. 61/136,964, filed Oct. 17, 2008; and International PCT Application No. PCT/US2008/006660, entitled "Multi-Axis Metamorphic Actuator And Drive System And Method," filed May 23, 2008, claiming priority to U.S. Provisional Application No. 61/064,351, filed Feb. 29, 2008.

TECHNICAL FIELD

The technical field relates to methods and systems for supporting and moving an object in one axis. When deployed as part of a system for supporting and moving an object in one axis, non-linear and rolling lobe actuator systems and methods may be applied to any of a wide variety of fields as a complete replacement for older technologies, mechanisms, and methods for moving, driving, positioning, or actuating objects or loads in single-axis orientation, or multi-axis positioning when deployed as a pair of actuators such as for the positioning of heliostats, solar and satellite tracking systems, electromagnetic radiation antennas, infrared optical sensors, advertising materials, hoists and cranes, weapons, and machines and equipment for maintenance and repair, and for the manipulation of remote tools or surgical implements, among many large or small scale applications.

BACKGROUND

Current actuators manipulate and position objects in single axis and multiple axes of orientation, altitude, and azimuth in various fields such as solar power, astronomy, satellite communications, RADAR, thermal imaging, construction, weapon deployment, and advertising. With respect to large scale or heavy equipment applications, current actuators employ gear drives, planetary gears, hydraulic pistons, pneumatic pistons, screw drives, and various clockwork machinery to position large and heavy objects around stationary mounts. Due to their reliance on electrical motors and various hydraulic means to move heavy and large objects, current actuators require large numbers of precision-engineered parts and a significant electrical power supply. Current actuators also require multiple heavy connections between structural members and actuators to support and position heavy and large objects. Hydraulic and electric drives require expensive hoses and cabling to transmit power. The heaviness and the precision metal-to-metal gearing and mechanics of current actuators dictate that normal metal fatigue, operational wear-and-tear and external stress, dust, contaminants, foreign objects, lubrication problems, and even minor operator errors and omissions create significant use-related damage, chattering, free play, and consequent degradation in accuracy and durability. Such actuators, which are also known as "clockwork" actuators, necessitate high costs of inspection, maintenance, repair, and replacement of precision-machined components, and consequent downtime from productive operations. Typically, the clockwork actuators do not provide a smooth tracking motion, but a periodic stepping motion common to the motorized systems.

Actuators are used in the collection of solar energy. Solar energy can be collected through the concentration of sunlight by aiming an array of mirrors such that they reflect sunlight into a single fixed receiver to produce concentrated heat for steam production. For an example of such a power plant see U.S. Pat. No. 6,957,536. The motion of the earth in rotation and around the sun in orbit necessitates a mechanism for aligning the mirrors or panels in a position relative to the sun as it moves across the sky on a daily basis and relative to the horizon on a seasonal basis so that solar energy is continuously reflected onto the receiver. Examples of solar collectors that provide single-axis tracking are disclosed in U.S. Pat. No. 4,135,493 and U.S. Patent Application 2008/0128017. Other solar collectors track the sun's motion in multiple axes. In practical terms, devices to constantly orient a collector or mirror toward the sun must provide a means for continuously adjusting azimuth (rotation around the horizon line) and altitude (rotation from the horizon to a position directly overhead) to continuously track the apparent motion of the sun through the sky.

Current solar energy collectors include devices that rotate in a single axis and multiple axes to maintain the desired orientation of a panel of solar cells and solar thermal collectors or mirrors throughout the day and year. These devices are referred to as "trackers," "heliostats" or "positioning systems." Thus far, current positioning systems are complex and expensive. Particularly as the size of the of the mirrors and photovoltaic panels increase to over 100 $m^2$ on a single tracker, the complex precision gear drives and powerful motors required to maneuver and stabilize the panels (particularly in high wind conditions) have emerged as the largest single cost barrier in pursuing large scale solar power generation. These clockworks are delicate and prone to mechanical failure or degradation under normal and abnormal operating conditions. These and other limitations of current heliostat technology are among chief barriers to lowering the cost of electrical generation via solar thermal or concentrated solar energy to equal or below the cost of electricity from coal and natural gas-fired generating plants.

Other typical examples of the current heliostat technology include U.S. Pat. No. 3,070,643 disclosing a closed loop servo system for continuously pointing a solar cell directly toward the sun by sensing the sun's position and selectively driving the solar cell support about one or the other of a pair of axes. This patent discloses a complicated gearing system with a single drive motor and an electrically operated clutch to permit selective dual-axis drive. Another system, disclosed in U.S. Pat. Nos. 3,998,206 and 3,996,917, employs separate drive motors for obtaining dual-axis movement. The use of motor drives and gear reduction adds significantly to the cost of initial installation and maintenance of a sun tracking apparatus. In addition, the power required to drive the powerful motors creates a parasitic power drain on the operation of the solar power plant. The use of gear and motor drives is typical of the current actuators as disclosed in, by way of example, U.S. Pat. No. 6,440,019.

Another disadvantage of the current heliostat technology is its reliance, in most cases, on external sources of power. The current actuators require the provision of electrical or hydraulic power to orient the application. This generates a parasitic power drain on the installation, and also requires complicated and expensive electrical or hydraulic power distribution systems using cables or hoses for their operation. By their nature, heliostat arrays often cover many square kilometers, and thus, over a large installation, the provision of external power through cables to an array of thousands of heliostats adds to major capital and maintenance expense. The current actuators fail to achieve a low cost means of providing multi-axis sun tracking with minimal power requirements. Accordingly, there is a need for a cost and power efficient single and multi-axis actuator for use in small to large scale applications.

Current actuators' use of fluid pressure springs and incorporation of a piston and a flexible member that forms a rolling lobe as the piston reciprocates in operation is described in many patents such as U.S. Pat. No. 3,053,528, and in U.S. Pat. No. 4,378,935. These devices, in the form of a flexible membrane coupled to a piston, produce large amounts of motive force as they expand. While these devices may be used as actuators, they are mainly used as shock absorbers or springs on heavy machinery and vehicles, measured primarily by lifting capacity or compression and extension capacity. These devices have a very limited range of motion or play and very limited use for motion control requiring accuracy. These devices are not designed for controlled non-linear motion, rotary motion or arcuate motion, and exhibit little if any capability for such rotary motion or for control of such motion. Accordingly, there is a need for improved single-axis and multi-axis actuators.

SUMMARY

An embodiment of a system for moving an object in one axis includes a fluid and one or more fluid inflatable containers which are arranged to transmit fluid pressure to a plunger, such that the flexible wall of the fluid inflatable container forms a rolling lobe in response to changes in volume, enclosed within a cylindrical enclosure or drum, a shaft running axially through the center of the drum and coupled to the drum by bearings so that the drum and shaft may move freely in relation to one another, one or more vanes running longitudinally and extending radially from the axial shaft to the inner surface of the drum, and one or more vanes running longitudinally and extending radially from the inner surface of the drum to the surface of the shaft. The object to be moved may be connected directly or indirectly to either the shaft or to the drum. The fluid inflatable containers are arranged in a whole or partial annular ring inside of the drum around the shaft so that each container exerts expansive force between a vane fixed to the drum and a vane fixed to the shaft. A volume of the fluid is placed in the one or more fluid inflatable containers. The system further includes a fluid mover operably connected to the one or more fluid inflatable containers for moving the fluid into the one or more containers. The system further includes a fluid volume control for controlling the volume of fluid in the one or more containers. By changing the volume of fluid in the one or more containers the object is moved. In an embodiment an arced plunger is used to assist in creating the rolling lobe.

In an embodiment, the object or application to be positioned may be a photovoltaic panel, a solar reflecting mirror, a satellite dish, an infrared imaging sensor, an electromagnetic radiation antenna or emitter, a telescope, a sensor array, a detector, a weapon or weapons system, a thermal weapons system, a targetable weapon, a medical device, a medical robotics actuator, a diagnostic machinery and robot, an external or internal prostheses or prosthetic implant, a surgical or micro-manipulation tool or device, an advertising material, signage, construction equipment, a valve, a flow control device, a control surface for an aircraft, a yaw or pitch control device for wind mill or wind turbine blades, a rocket thruster, a thruster on a ship or aircraft, a machine tool, a leveling or jacking device, a vehicle suspension system, a patio umbrella, a sun shade, or a device or actuator for positioning any other object. The combination of more than one of such embodiments permits multi-axis motion of the object or application.

Non-linear actuators are described. The actuators may be used for non-linear repeatable movement of an object including a non-linear plunger having two ends and a mid-portion with an arcuate shaped exterior surface operably connected to the object to be moved. One embodiment of the actuator further includes a fluid inflatable container having a flexible membrane engaging with the plunger, wherein the flexible membrane rolls onto the arcuate shaped exterior surface of the plunger, such that inflating the fluid inflatable container causes a portion of the flexible membrane to unroll from the arcuate shaped exterior surface of the plunger and the inflating also exerts a force upon the plunger causing the object to move in a non-linear motion. The actuator further includes an opposing fluid container and one or more control valves operably connected to the fluid inflatable container. The actuator includes an electronic pressure sensor connected to the fluid inflatable container and electronic actuators for the one or more control valves for pressurizing and de-pressurizing the fluid inflatable container. The actuator includes an electronic location sensor for determining a location of the object and a computer, having a processor and a memory, that controls motion of the object by electronically actuating the one or more control valves in response to signals received from the electronic pressure sensor and the electronic location sensor. The computer may also record output values of the electronic pressure sensor and the electronic location sensor, and positions of the one or more control valves. Electromagnetic signals may be used for communications.

Further described herein is an arced actuator to move an object in a repeatable arced motion including a movable member connected to the object, a housing operably connected to the movable member, a first plunger attached to the movable member and having a curved mid-portion along a longitudinal axis and a second plunger. The arced actuator further includes a first fluid inflatable container constrained by the housing where the first plunger is engaged by the first fluid inflatable container and a second fluid inflatable container constrained by the housing where the second plunger is engaged by the second fluid inflatable container. The arced actuator further includes one or more control valves operably connected to the first fluid inflatable container, one or more control valves operably connected to the second fluid inflatable container, an electronic pressure sensor connected to the first fluid inflatable container, an electronic pressure sensor connected to the second fluid inflatable container, and electronic actuators for the one or more control valves for pressurizing and de-pressurizing the fluid inflatable containers. The arced actuator further includes an electronic location sensor for determining a location of the object and a computer, having a processor and a memory, that controls the motion of the object by electronically actuating the one or more control valves in response to signals received from the electronic pressure sensor and the electronic location sensor and communicates output values of the electronic pressure sensor and the electronic location sensor, and positions of the one or more control valves using electromagnetic signals. The inflation of the first fluid inflatable container causes the first plunger and second plunger to move in a non-linear motion in the direction of the second fluid inflatable container.

Further described herein is an arced actuator to move an object in a repeatable arced motion including a movable member connected to the object, a housing operably connected to the movable member, a plunger attached to the movable member and having a curved mid-portion along a longitudinal axis, and an elastic tensioning device such as a torsion spring or spiral spring operably connected to the movable member. The arced actuator further includes a fluid inflatable container constrained by the housing where the plunger is engaged by the fluid inflatable container. The arced actuator further includes one or more control valves operably connected to the fluid inflatable container, an electronic pressure sensor connected to the fluid inflatable container, and electronic actuators for the one or more control valves for pressurizing and de-pressurizing the fluid inflatable container. The arced actuator further includes an electronic location sensor for determining a location of the object and a computer, having a processor and a memory, that controls the motion of the object by electronically actuating the one or more control valves in response to signals received from the electronic pressure sensor and the electronic location sensor and communicates output values of the electronic pressure sensor and the electronic location sensor, and positions of the one or more control valves using electromagnetic signals. The inflation of the fluid inflatable container causes the plunger to move in a non-linear motion in a direction opposite the predisposition of the elastic tensioning device.

A method is disclosed for moving an object in a repeatable non-linear motion using an actuator and a computer including receiving, at a computer, an electronic signal to move an object in non-linear motion and electronically activating a valve connected to a first fluid container using a computer. The method further includes inflating the first fluid container having a flexible portion using the activated valve, unrolling the flexible portion of the first fluid container from an outer surface of a first arced plunger, exerting a force on the first arced plunger causing it to move away from the fluid container and towards a movable vane, wherein the plunger moves in a non-linear direction, moving the movable vane and thereby an object connected to the movable vane in a non-linear direction. The method further includes sensing, using an electronic sensor, the movement of the object and communicating from the sensor to the computer the movement of the object. The method includes rolling a flexible portion of a second fluid container onto an outer surface of a second arced plunger, deflating the first fluid container under computer control and rolling the flexible portion of the first fluid container onto the outer surface of the first arced plunger wherein the object moves in a second non-linear direction which is a direction opposite the first non-linear direction.

A further method is disclosed for moving an object in a repeatable non-linear motion using an actuator and a computer including receiving, at a computer, an electronic signal to move an object in non-linear motion and electronically activating a valve connected to a fluid container using a computer. The method further includes inflating the fluid container having a flexible portion using the activated valve, unrolling the flexible portion of the first fluid container from an outer surface of an arced plunger, exerting a force on the arced plunger causing it to move away from the fluid container and towards a movable vane, wherein the plunger moves in a non-linear direction, moving the movable vane and thereby an object connected to the movable vane in a non-linear direction. The method further includes sensing, using an electronic sensor, the movement of the object and communicating from the sensor to the computer the movement of the object. The method includes storing of the energy used to inflate the fluid container in a torsion spring such as a spiral or clock spring operatively connected to the movable vane, deflating the fluid container under computer control and rolling the flexible portion of the fluid container onto the outer surface of the first arced plunger wherein the object moves in a second non-linear direction which is a direction opposite the first non-linear direction.

BRIEF DESCRIPTION OF THE DRAWINGS

FIG. 2 shows a view of an embodiment of a system for moving an object in one axis rotated to approximately 90° counter-clockwise position without the rolling lobe sections shown.

FIG. 3A shows a perspective view of two concatenated systems for moving an object in one axis including two drums.

FIG. 4 shows a cutaway view of an embodiment of a system for moving an object in one axis as an arced actuator to move an object in a repeatable arced motion.

FIG. 8 shows a cutaway view of the system showing a single continuous cell and a plunger not in fluid communication with the cell forcing the formation of a rolling lobe.

FIG. 10 shows a cross-sectional view of an embodiment of a system for moving an object in one axis with a reduced range of motion.

Figure 1:
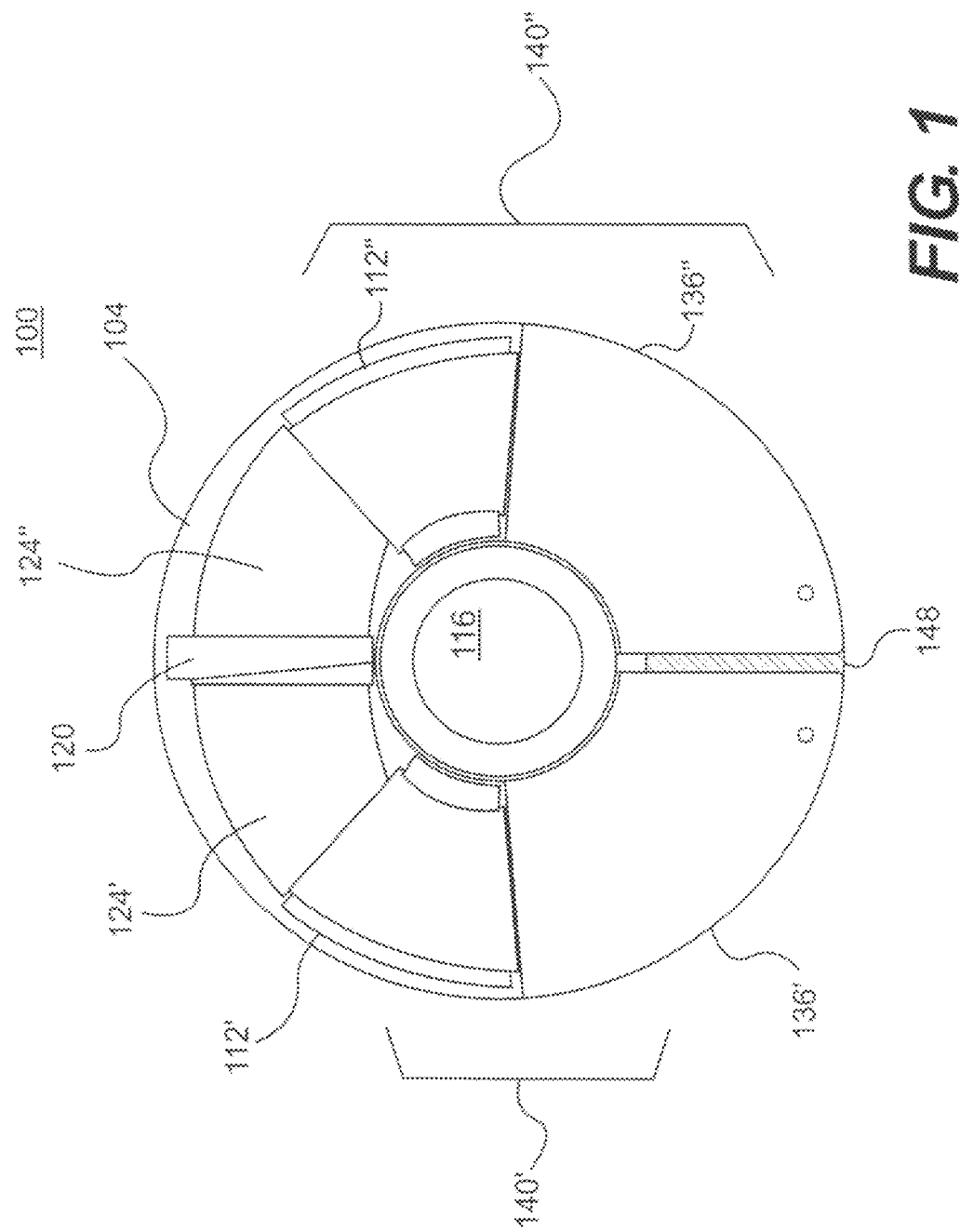
FIG. 1 shows a cutaway view of an embodiment of a system for moving an object in one axis in the top dead center position with all component parts in position.

Before one or more embodiments of the system for moving an object in one axis are described in detail, one skilled in the art will appreciate that the system for moving an object in one axis is not limited in its application to the details of construction, the arrangements of components, and the arrangement of steps set forth in the following detailed description or illustrated in the drawings. The system for moving an object in one axis is capable of other embodiments and of being practiced or being carried out in various ways. Also, it is to be understood that the phraseology and terminology used herein is for the purpose of description and should not be regarded as limiting.

DETAILED DESCRIPTION

The use and advantages of rotary actuators that make use of fluid inflatable containers to generate high-torque, high-precision single and dual-axis positioning are fully discussed in commonly assigned PCT application number PCT/US2008/006660, filed May 23, 2008, and PCT application number PCT/US2009/000825 filed Feb. 18, 2009, which are fully herein incorporated by reference as if set out in their entirety herein.

In some applications it may be desirable to reduce the friction of the internal components of the Single-Axis Drive Systems and Methods beyond the static and dynamic friction produced by the motion of sliding and/or collapsible fluid inflatable containers to the level of rolling friction. The embodiments disclosed herein reduce or allow for the elimination of almost all sliding friction within the system by modifying the fluid inflatable container to form a rolling lobe as the container changes volume.

Referring to FIG. 1, an embodiment of a system 100 for moving an object in one axis includes a shaft 116 to which is fixed a vane 120, which is operatively coupled to and runs longitudinally through the center of the drum 104. Bearings (not shown) hold the shaft 116 in a central axial position within the drum 104. The object to be moved may be coupled to either the drum 104 or the shaft 116. The plungers 124', 124" or pistons 124',124" are mounted to each side of the vane 120, and may be fixed with bolts or other fasteners. A fluid inflatable container 140',140" consisting of a rigid section or "boot" 136',136" and a flexible section or "sleeve" 112',112" is arranged so that it is contact with the end of the plunger 124',124" opposite the vane 120. When air is introduced through the fill port, which may be located in the boot, the sleeve 112 portion inflates and moves into the clearance between the surface of the vane 120 and the drum 104 by rolling along the surface of the vane 120. The inflation causes the sleeve 112 portion to exert a force on the plunger 124', 124" and forces the plunger 124',124" against the vane 120, causing the shaft 116 to rotate in the drum 104. As one fluid inflatable container 140',140" inflates, the plunger 124',124" moves to the opposite container and is forced into the boot 136',136", forcing the sleeve 112 to invert upon itself and form a rolling lobe as the sleeve 112 is rolled off the drum 104 wall. The vane 120, and thus the shaft 116, can be moved into a range of positions with great precision and force by changing the relative pressures and volumes within the two fluid inflatable containers 140',140". In this embodiment, the boots 136',136" are bolted to the drum 104. In an alternate embodiment, the boots 136',136" may be bolted to each other or fitted into the drum 104 without being bolted to each other or the drum 104. Alternatively, the vane 148 may be formed by two surfaces of the boots 136',136" in contact with each other when the boots 136',136" are made of a rigid or semi-rigid material. In this embodiment, the system 100 is shown positioned at the top dead center position 144.

The rolling lobe sleeve 112 is not required to slide along the wall of the drum 104, and this allows the system 100 to operate with little or almost no internal friction.

The fluid inflatable containers 140 may be entirely formed from the same material as the flexible sleeve 112 portion. The containers 140 may also have other features formed into them such as mechanical attachment features to connect the containers 140 to the plungers 124 and/or the vane 120.

The arcuate motion of the system 100 can be extreme because the fluid inflatable container 140',140" does not need to resist the large stresses that would build up in an unconstrained fluid inflated container. The plunger 124',124" is guided in an arcuate path by the rotation of the shaft 116, so that little or no internal friction will be generated within the fluid inflatable container 140',140". Referring now to FIG. 2, shown is an embodiment of system 100 for moving an object in one axis. The object 810 (not shown) may be rotated through at least a 160° range of motion as the rolling lobe sleeves 112 (not shown) move from almost fully extended on one side, to almost fully retracted on the other side. Various embodiments of system 100 can be rotated through at least a 180° range of motion. The rigid portion or boot 136',136" can be made smaller to accommodate ranges of motion of greater than 180°. In an embodiment, the rigid portion or boot 136', 136" is not required. The entire fluid inflatable container 140 is made of the same material with the same properties throughout.

Figure 3B:
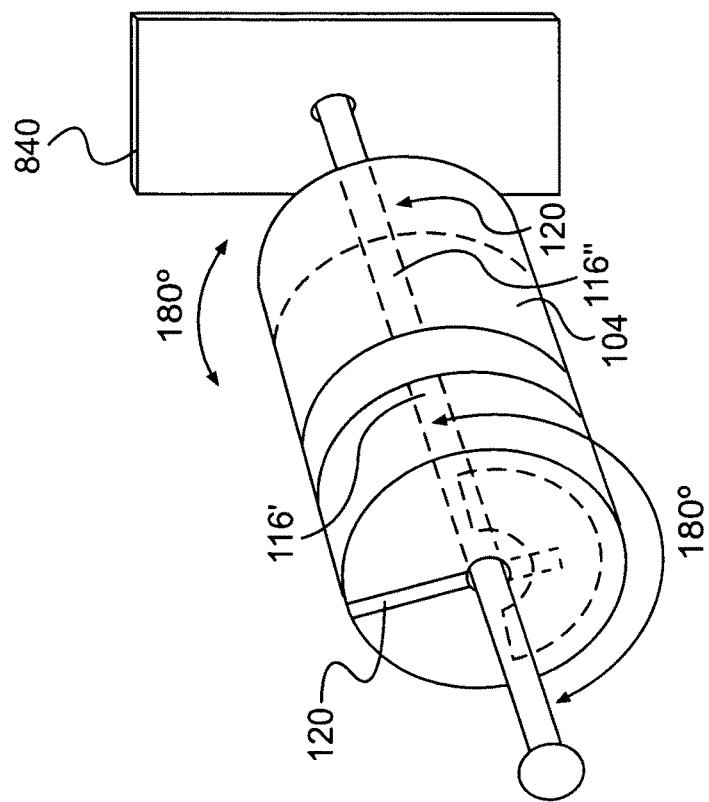
FIG. 3B shows a perspective view of two concatenated systems for moving an object in one axis using a single drum.

FIGS. 3A-3B show perspective views of two concatenated systems 100' and 100" or actuators for moving an object in one axis. The concatenated embodiments shown in FIGS. 3A-3B use two systems 100' and 100" connected together, either through a common shaft 116 assembly (as in FIG. 3A), or a common drum 104 assembly (as in FIG. 3B), to produce a range of motion that may be double the range allowable from a single actuator (system 100). For example, in both embodiments shown in FIGS. 3A-3B, one system 100' capable of a 180° range of motion is connected to a second system 100" also capable of a 180° range of motion, allowing 360° of rotation. A 360° range of rotation is made possible when in one system 100, the shaft rotates while the drum is stationary and in the other system 100, the drum rotates while the shaft is stationary.

With continuing reference to FIG. 3A, in an embodiment, two drums 104' and 104" are connected to rotate as a single unit. Each drum 104',104" has a bearing 804 for allowing the shaft 116 to rotate freely within the drum and a plunger 124' and 124", respectively, which allows 180° of motion. The drums 104',104" are positioned so that the ranges of motion are opposite one another. When one system 100' is rotated to the full range of its motion, the second system 100" can be rotated to allow the full range of the second system's motion. In this embodiment, a reference 840 is connected to the drum of one system 100" by a flange 190, while the application to be moved is connected to the drum of a second system 100'. In this embodiment, the first and second systems 100' and 100" are connected by a common shaft 116.

Referring now to FIG. 3B, a reference 840 is connected to the drum of one system 100," while the application to be moved (not shown) is connected to the drum of a second system 100'. In this embodiment, the first and second systems 100' and 100" are connected by a common drum 104.

Referring now to FIG. 4, shown is a partial cutaway view of an embodiment of a system 100 for moving an object in one axis rotated to approximately 90° position showing the plunger 124" positioned inside the boot and without the rolling lobe sections shown. The system 100 or arced actuator shown moves an object in a repeatable arced motion. In this embodiment, two plungers 124',124" are shown. The plungers 124',124" are shaped to allow a plunger 124',124" to slide fully into the boot 136',136" section of a fluid inflatable containers 140',140" without striking the walls and without compressing the boots 136',136." In other embodiments, a plungers 124 may be nested within another plunger.

Figure 5:
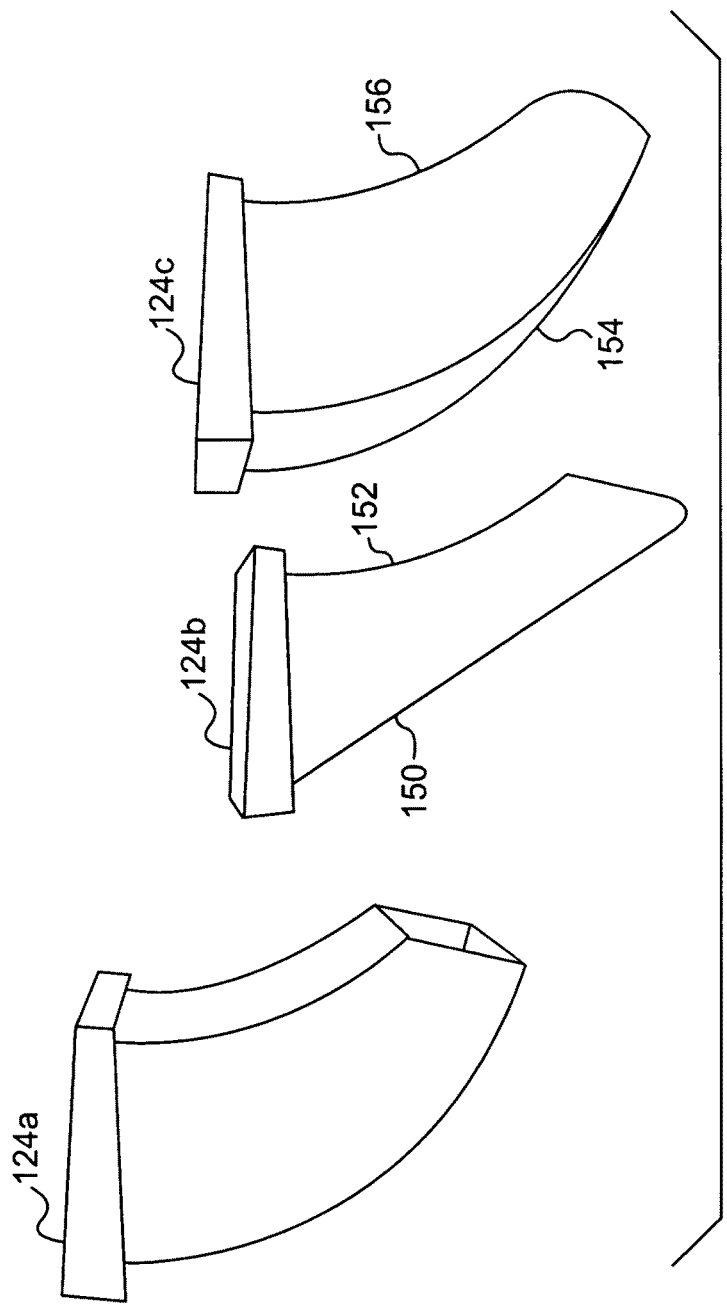
FIG. 5 shows three versions of the many possible configurations of plungers that force the fluid inflatable container to form a rolling lobe as they travel through an arcuate path inside the drum

Referring again to FIG. 5, shown are examples of various possible shapes of a plunger 124. These plungers 124a-124c are shown curving to the left. Plungers 124a-124c may similarly curve to the right. The plungers 124a-124c are shaped to provide a space between the wall of the drum 104 (not shown) and the side wall of the plungers 124a-124c sufficient to allow a rolling lobe (not shown) to form in the membrane of the fluid inflatable containers 140',140". The plunger 124a is shown with a curved, hollow shell that may be filled with a high density material such as concrete. Plunger 124b is an alternative solid, plunger shape where one of the surfaces is straight 150 and one of the sides is curved 152. Plunger 124c is shown as a solid plunger with two arced sides 154,156. The bottom surfaces of the plungers 124a-124c come in contact with the fluid inflatable containers 140',140". The length of a plunger 124 helps determine the plungers 124',124" range of motion.

In an embodiment, the rolling lobe 112 may be coupled to a bottom surface of a plunger 124',124". A plungers 124',124" may be constructed of steel, aluminum, plastic, or any other sufficiently strong rigid or semi-rigid material. It may include reinforcing ribs within to counter the forces imposed by the pressure transmitted by the fluid inflatable container 140', 140". The plunger 124',124" is slightly tapered to allow the plunger 124',124" to smoothly displace and move the walls of the fluid inflatable container 140',140". The plunger 124', 124" should have a smooth outside wall and radiused corners to avoid damage to the fluid inflatable container 140',140". The plunger 124',124" should be sized so that the gap between the drum 104 wall and the plunger 124',124" does not exceed the maximum unsupported radius of the material making up the fluid inflatable container 140',140" at the system's working pressure.

Figure 6:
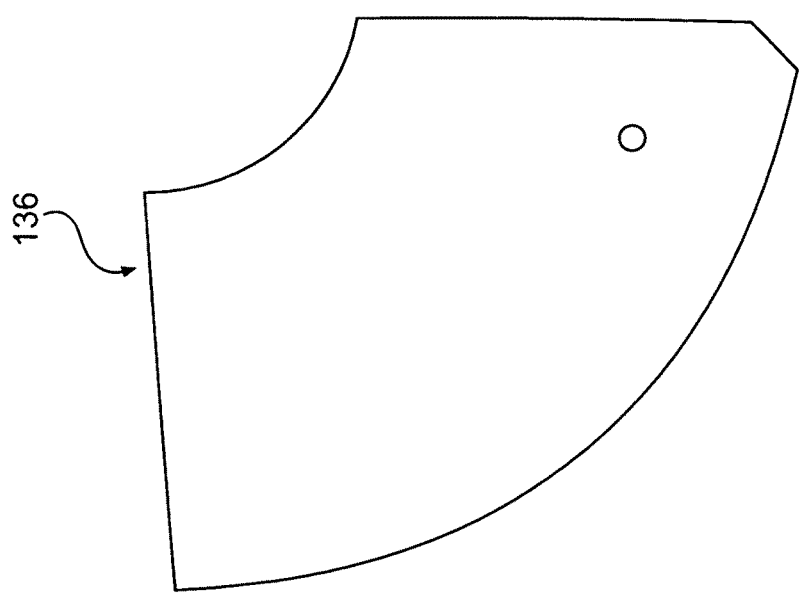
FIG. 6 shows the lower rigid portion of one of the fluid inflatable containers.

Referring now to FIG. 6, in one embodiment the fluid inflatable containers 140',140" are made up of a lower section or boot 136',136" which may be a rigidly molded plastic, elastomer, or metal. This section may be continuously molded with the sleeve 112 or flexible section that forms the rolling lobe. Alternatively it may be formed like a tire with a bead that may be swaged or otherwise coupled to the sleeve 112. The boot 136',136" section need only be rigid enough in operation to resist deformation and ensure that the rolling lobe sleeve 112 is the only portion of the fluid inflatable container 140',140" that substantially deforms in response to changes in fluid pressure and volume. In many applications, the fluid containers' internal pressure will be sufficient to eliminate the need for a distinct boot section. The boot 136', 136" may incorporate a metal plate to connect it to the vane 120 in the drum 104. The boot 136',136" is operatively coupled to the rolling lobe sleeve 112. The boot typically fills a quadrant of the drum 104, for example the lower quadrant.

Figure 7:
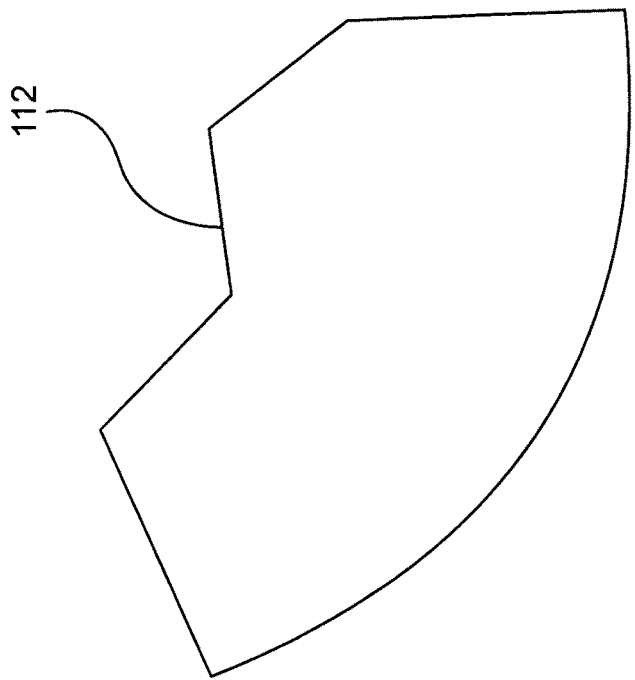
FIG. 7 shows the rolling sleeve portion of one of the fluid inflatable containers.

Referring now to FIG. 7, in one embodiment the fluid inflatable containers 140',140" are also comprised of a rolling lobe sleeve 112 which may be smaller than the volume that it will expand to fill as it is pressurized. The lobe sleeve 112 is coupled to the boot 136',136" on one end and the bottom of the plunger 124',124" at the other. Once all the components are coupled, the fluid inflatable container 140',140" is complete. This embodiment thus provides fluid communication between the boot 136',136", the sleeve 112 and the plunger 124',124".

Referring now to FIG. 8, in one embodiment the fluid inflatable containers 140',140" are simple cells that consist only of a flexible membrane such as a heat sealed, urethane coated nylon fabric with a single fill port. The fluid inflatable container 140',140" can also be made out of elastomers, coated fabrics, multi-ply composites, or any material that can contain the fluid flexibly. In one embodiment, the fluid inflatable container 140',140" is shaped to fill slightly more than one half of the drum 104 at full inflation. The fluid inflatable containers 140',140" may have features that allow for mechanical attachment of the top face of the fluid inflatable container 140',140" to the bottom of the plunger 124',124" such as Velcro pads, grommets, or metal loops for straps. Mechanical attachments provide greater certainty that the fluid inflatable container 140',140" will remain in the proper position in the enclosure. The motion of the plunger 124',124" combined with the internal pressure of the fluid inflatable container 140',140" forces the wall of the fluid inflatable container 140',140" to form a rolling lobe against the wall of the drum 104 as the plunger 124',124" travels its arcuate path.

The plunger 124',124" may constructed by any of a number of typical industrial processes such as injection molding, drawing, assembly of cut parts into a weldment, or by casting and machining. The plunger 124',124" may have smooth sides, and a tapered shape in the wall from the vane 120 to the bottom. In some applications it may be useful to create very heavy plungers 124',124" that can serve as counterweights to the object to be moved, plungers 124',124" may also be filled with high-density materials such as liquids, concrete or ceramics to add to the counterweight effect. Plungers 124', 124" filled with concrete are cost efficient to produce as the shell of the plungers 124',124" may be made of cheaper, light-weight materials which travel easier. The lightweight shells are then filled with concrete or other high-density materials. The filling process can occur on-site. In an embodiment, plungers 124',124" have internal structures such as framing or ribs for stability or strength.

Tolerances on the plunger 124',124" can be large, on the order of /1;4" or more, as the plunger 124',124" is a non-precision component. The plunger 124',124" may have a smooth outer surface to avoid damage to the fluid inflatable containers 140',140" and be tapered to allow smooth motion. The plunger 124',124" is subjected to large forces as it transmits the forces from the fluid inflatable containers 140',140" to the vane 120, and so it is preferred if the plunger 124',124" is capable of withstanding large amounts of force on the sides and bottom without significant or permanent deformation. The forces on the plunger 124',124" will be directly related to the pressure in the fluid inflatable container 140',140" and the surface area of the fluid inflatable container 140',140" in contact with the plunger 124',124". A single-plunger vane assembly may be created by substituting two plungers 124', 124" with a single, "two-headed" plunger. The two-headed plunger may be a single assembly and may includes the vane 120 and be connected directly to the shaft 116.

The arcuate motion produced by an embodiment of this invention is not limited to a circular path as shown in the drawings. So long as the motion of the plunger 124',124" is guided through an arcuate path similar to the curvature of the enclosure surrounding the fluid inflatable containers 140', 140", the object can be moved. The movement and curvature of the enclosure can be similar in shape. The movement of the object is based upon the movement of the shaft 116, movable member, or non-stator portion of the actuator. Various non-linear object motion is possible including crescent shaped, oval shaped, rotary, curves and other irregular patterns. The non-linear motion can be reversed and repeated by the actuator system. The fluid inflatable container 140',140" may be charged with varying amounts of non-volatile gas or fluid. In an embodiment, the fluid may be air, water, gas, oil, high-density fluid, high-pressure hydraulic fluid, electro reactive fluid, high viscosity fluid, or a solid at ambient temperature. For example, when the object or application needs to be moved, the solid fluid may be heated by a heating device and transformed to a liquid. After the object or application is in place, the liquid may be cooled to ambient temperature and transformed back to a solid fluid.

In an embodiment a chemical reaction may be used to create gas or create pressure either in a storage tank or within a third container. In an embodiment, the fluid inflatable containers 140',140" can be charged with a regulated flow of fluid from a pipeline whose flow is in turn regulated by a large valve actuated by the system. For example, gas from a pipeline may be regulated down to a pressure suitable for operating the system 100 that is in turn used to actuate a large quarter-turn ball valve that controls the flow through said pipeline.

In an embodiment, a fluid inflatable container 140' exerts force against another fluid inflatable container 140" and/or against a spring such as a torsion spring. In an embodiment one or more fluid inflatable containers 140',140" occupy less than the entire inner volume of the drum 104, with open areas between fixed vanes 120 attached to the inner surface of the drum 104 occupying some of the inner volume of the drum 104, allowing smaller fluid inflatable containers 140',140". Fluid inflatable containers 140',140" may be connected to each other and/or to a fluid mover with a tube to pass fluid.

The actuators are unaffected by normal and abnormal external stresses, vibration, or shaking applied to the object or application during operation. The force or pressure inside the actuators is magnified by the surface area over which the actuators apply force against the vanes 120 to move the object or application, and this distributed force allows them to easily absorb inertia or momentum created by the object or application itself (which may be exceedingly heavy and massive, far more massive than with current actuators) or exerted by externalities acting upon the object or application.

Figure 9A:
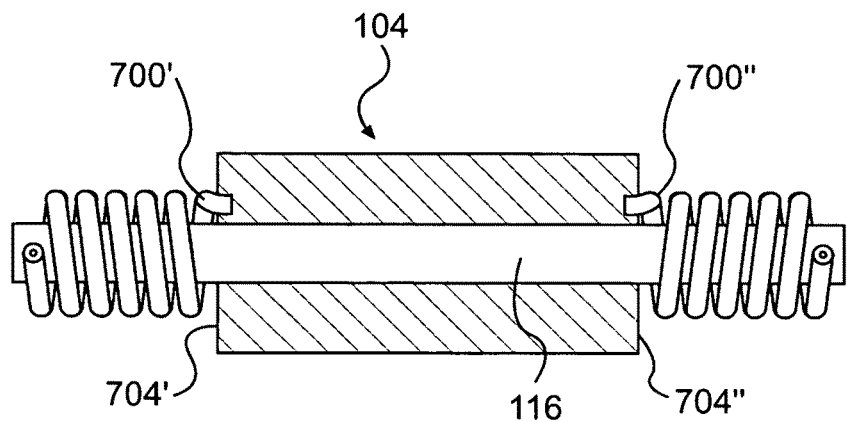
FIG. 9A shows a side view of an embodiment of a system for moving an object in one axis including a torsion spring.

Referring now to FIG. 9A, shown is a side view of an embodiment of a system for moving an object in one axis including an elastic tensioning device or devices such as torsion springs 700' and 700". In this embodiment, coiled torsion springs 700' and 700" are shown connected to the shaft 116 at one end 720',720" and the other ends of the coiled torsion springs 700' and 700" are connected to the endplates 704' and 704" of the drum 104. In another embodiment only one coiled torsion spring is used. The inflation of the fluid inflatable container 140 causes the plunger 124 (not shown) to move in a non-linear motion in a direction opposite the pre-disposition of the elastic tensioning device, coiled torsion springs 700' and 700", in this example.

Figure 9B:
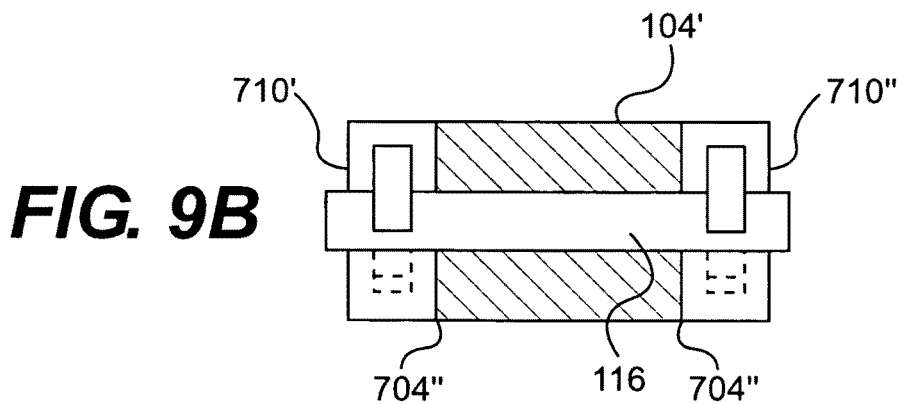
FIG. 9B shows a side view of an embodiment of a system for moving an object in one axis including a clock spring.
Figure 9C:
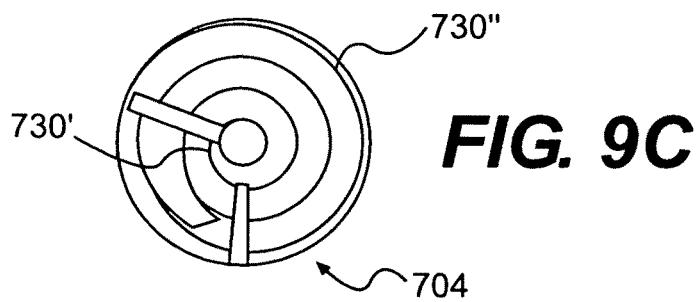
FIG. 9C shows an end view of an embodiment of a system for moving an object in one axis including a clock spring.

Referring now to FIG. 9B-9C, shown is a side view and an end view, respectively, of an embodiment of a system for moving an object in one axis including torsion springs such as clock springs 710' and 710". Referring to FIG. 9C, in this embodiment, the clock springs 710' and 710" are shown connected to the shaft 116 at one end 730', 730" and the other ends of the clock springs 710' and 710" are connected to the endplates 704' and 704" of the drum 104. The arrangement of the torsion springs in this embodiment allows the system 100 to remain in a stowed position, until the system 100 begins to move upon inflation of a fluid inflatable container 140. The location of the torsion springs in relation to the drum 104 may vary in other embodiments of system 100. The torsion springs 710' and 710" are not required to be connected to the drum 104, the torsion springs maybe connected to the object to be moved 810, for example. When torsion springs such as coiled torsion springs and clock springs are used in embodiments of system 100, a single plunger 124 and fluid inflatable container 140 may be used. The use of an elastic tensioning device allows the system to store energy in a mechanical device as opposed to the use of pressurized fluid containers such as hydraulic accumulators or pressure vessels. This has the added benefit of allowing the system to automatically return the object to be moved 810 to a stow position with little or no external power. For example, a valve may be used that opens when electrical power is cut off. In the event of a power failure, the fluid inflatable container 140 begins to deflate as fluid flows through the open valve and the elastic tensioning device returns the object to be moved 810 to the stowed position. By properly sizing this valve, the object to be moved 810 will predictably and smoothly return to the stow position without operator or machine intervention.

Referring now to FIG. 10, shows an cross-sectional view of an embodiment of a system 100 for moving an object in one axis with a reduced range of motion. In this embodiment, a portion of the drum 104 is dead space 160, delineated by vanes 164' and 164". In this embodiment, due to the dead space 160, less area is available in the drum 104 for the plungers 124',124", fluid inflatable containers 140',140", and boots 136',136", providing a shortened range of motion. The range of motion is reduced in the embodiment shown because the plungers 124' and 124" are smaller than those in embodiments where there is no dead space 160 in the drum 104 (such as the embodiment of FIG. 1). Such a system 100 may be desirable due to its lighter weight in applications where a reduced range of motion is appropriate. Further, this lighter embodiment of system 100 would be easier to handle and transport. If a filled dead space 160 is desired, the dead space 160 may be filled with a filler, such as concrete, for example.

Figure 11:
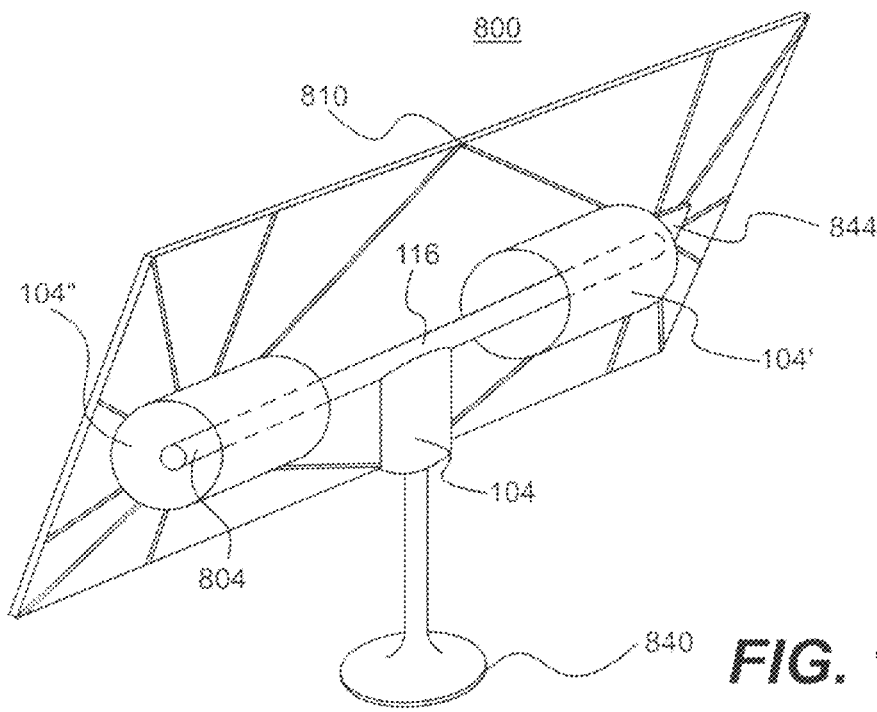
FIG. 11 shows a perspective view an embodiment of the system for moving an object in one axis including three drums arranged to provide multi-axis tracking.

Referring to FIG. 11, shown is a perspective view of an embodiment of a system 800 for moving an object in multiple axis including three drums 104, 104' and 104", arranged to provide multi-axis tracking by rotating an object 810, shown as a heliostat mirror application, in a horizontal axis. An embodiment of a system 100 for moving an object in one axis includes the object to be manipulated or positioned (the "application") 810 which is operatively coupled to a shaft or pipe 116 running longitudinally through the center of the drums 104' and 104". In this embodiment, the shaft 116 remains fixed and the object 810 is mounted on drums 104' and 104" by a connector 844. Rotating assemblies 804 (not specifically depicted) hold the shaft 116 in a central axial position within the drums 104' and 104". In this embodiment, the shaft 116 is connected to the drums 104' and 104" by a rotating assembly 804, (not shown) which may be a thrust bearing or other type of bearing, and a second bearing (not shown) which may be a plain contact, ball or other bearing suitable for carrying the weight and forces produced by wind loading on the application. The vanes 120 (not shown) may be arranged in the drum 104 to provide a range of motion of slightly more than 180° such that, when coupled to an elevation drive, the heliostat provides full multi-axis motion to point the application at any selected point. In this embodiment, the shaft 116 is fixed to a central support structure, or pedestal 840. The shaft 116 may be rotated in one axis by the drums 104' and 104" while being rotated in another axis by another drum 104 acting as an azimuth drive. In this embodiment, drums 104' and 104" together may act as an elevator drive. Other enclosures may be used in place of the drums 104, 104' and 104". Various shapes may be used for the enclosures including oval canisters.

With continuing reference to FIG. 11, the proportions of the drums 104 of system 100 are quite flexible, but generally follow a set of rules of thumb. For example, a drive that is 36 inches in diameter, with a 12 inch shaft 116, with a fluid power supply of 500 psi, can reasonably be expected to produce approximately 4200 foot pounds of torque for each inch of length. Thus, a system 100 of these proportions with a length of 17 inches, would produce approximately 68,000 foot pounds of torque. By increasing the pressure to 750 psi, the system's 100 output should increase to approximately 107,100 foot pounds. As a general rule, increases in drum 104 diameter provide greater than linear increases in torque by virtue of the fact that increasing the drum diameter moves the center of force further away from the axis of rotation. Thus, a drum 104 having a diameter of 24 inches with a 6 inch shaft and a fluid power supply of 750 psi can reasonably be expected to produce approximately 3,540 foot pounds of torque. Thus, requiring a drum that is 30 inches long to produce the same amount of torque as a drum that is 17 inch long and 36 inches in diameter. It will be appreciated by those skilled in the art that the structure of the drum 104 walls and endplates (not shown) should be strong enough to safely contain the forces generated by the pressure of the fluid being transmitted through the fluid inflatable containers to the drum and endplates. The geometry of a given drive may thus be dictated as much by the cost of a sufficiently reinforced drum and endplates, as any other factors.

The pressure that the system 100 operates at depends on the optimization of many factors to meet the needs of a user. These factors include, the physical enclosure (i.e., the drum 104) available to operate the system 100, the desired fluid and the fluid control components available, the cost parameters for the application, the available materials for the fabrication of the fluid inflatable containers 140, the desired weight of the completed system, and the fabrication processes available to produce the system components. Generally speaking, the system 100 powered by non-compressible fluids such as oils and water-based fluids can be operated at higher pressures and allowing for a more compact system 100 for a given torque output capacity. Conversely, typically, fluids that are compressible such as air or other gases, produce a larger system 100 for a given torque output capacity. Those skilled in the art will also appreciate that the more rigid structural characteristics of a system 100 using non-compressible fluid may be more appropriate for some applications.

Figure 12:
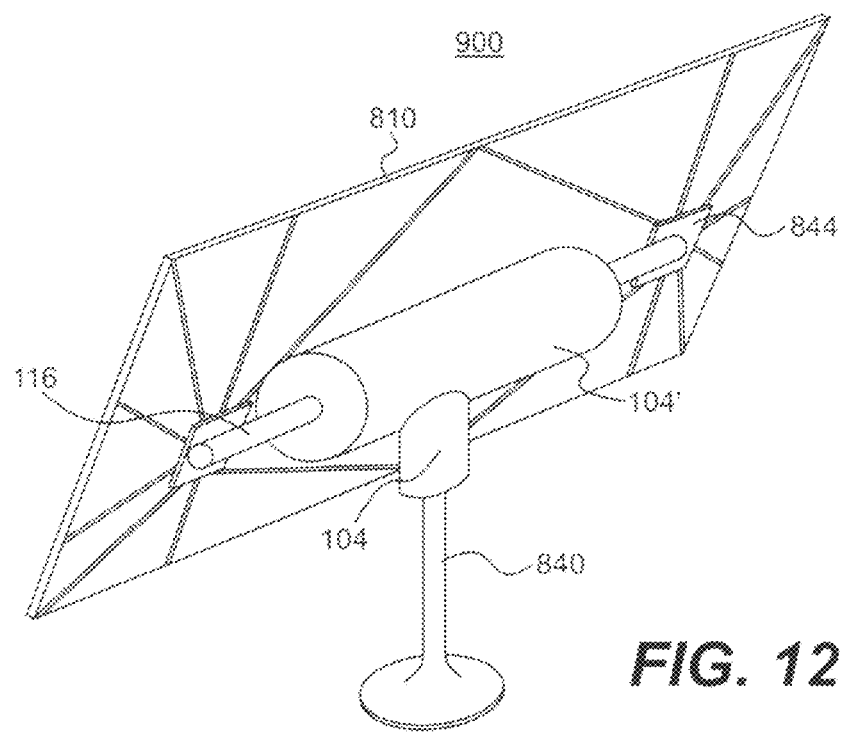
FIG. 12 shows a perspective view of three embodiments of the system for moving an object in one axis including two drums arranged to provide multi-axis tracking, while the object is mounted on a shaft.

Referring now to FIG. 12, shown is a perspective view of the system 900 for moving an object in multiple axis including two drums 104 and 104' arranged to provide multi-axis tracking. In the arrangement shown in FIG. 12, the object 810 may be mounted to the shaft or pipe 116 while the drum 104 remains fixed. In other embodiments, the object 810 may be mounted to a connecting structure, such as the connector 844 shown, that connects the object 810 to the shaft 116. In this embodiment, the drum 104 is fixed upon a pedestal 840, but may be fixed upon any structure, including the ground. The drum 104 rotates upon the pedestal 840. Further, in this embodiment, the drum 104 may act as an azimuth drive coupled to another drum, drum 104', acting as an elevator drive. In some embodiments, the connector 844 forms an integral part of the drum 104 or the shaft 116. In an embodiment of system 100, the connector may be bolts that connect the object 810 to the shaft 116 or drum 104. In another embodiment of system 100, the connector 844 may be a support structure for the object 810.

Figure 13A:
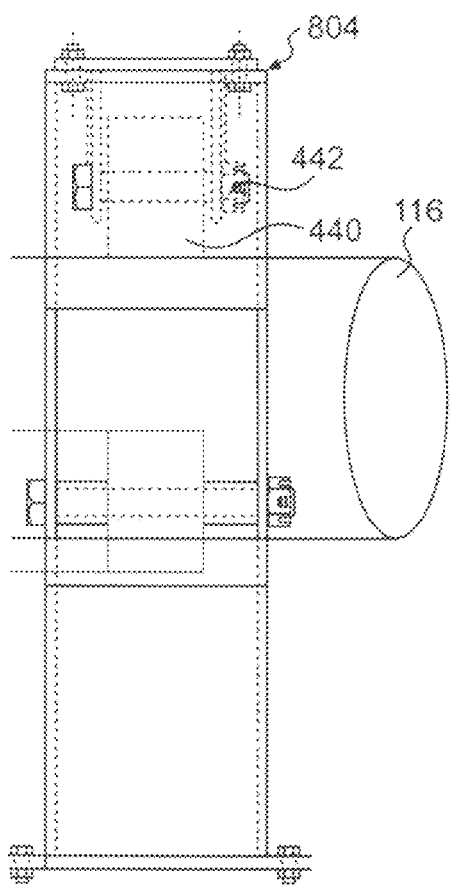
FIGS. 13A-13B shows side and frontal views respectively, of an exemplary rotating assembly for use in an embodiment of the system for moving an object in one axis.
Figure 13B:
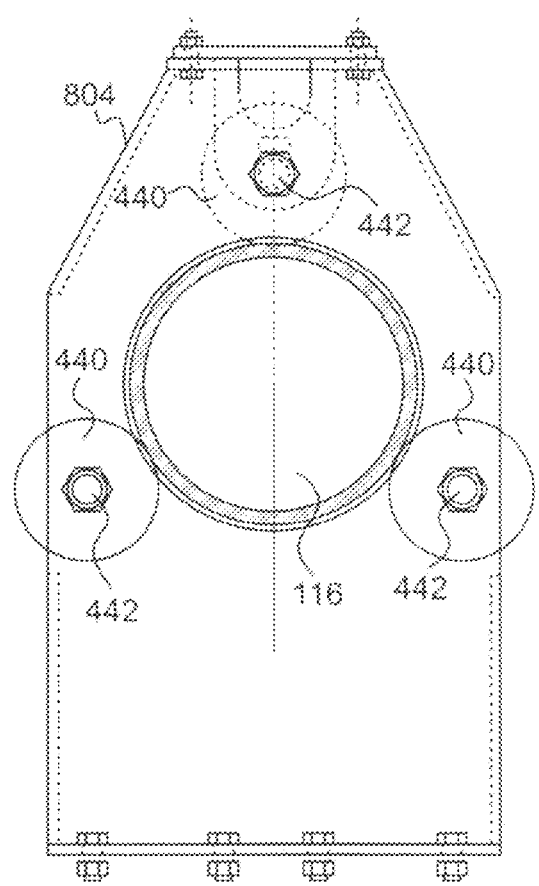

Referring now to FIG. 13A-13B, shown are side and frontal views of an exemplary rotating assembly 804 for use in an embodiment of the system for moving an object in one axis, respectively. Rotating assembly 804 is an example of a component that can be used for bearings in system 100. Referring to FIG. 13B, shown are three or more casters 440 mounted on the drum 104 (not particularly depicted) and arranged such that the shaft 116 is supported and can freely rotate in the center of the drum 104. Each of the casters 440 is attached to the rotating assembly 804 with one or more bolts 442. Each of the casters 440 is directly or indirectly attached to the drum 104. The rotating assembly 804 may be mounted outside of the drum 104, on an outside surface such as an end cap of a drum 104. The rotating assembly 804 may also be mounted inside the drum 104 on the inside of an end cap of the drum 104, for example. The rotating assembly 804 may also be connected to the drum 104 by a frame holding the rotating assembly 804 in place. The casters 440 may be easily removed for field service. A caster 440 can be replaced when it is not in contact with the shaft 116. In one embodiment, one or more casters 440 is adjustable so that it may be moved away from the shaft to create a small tolerance within which the shaft 116 may be moved radially away from each of the casters 440. In this manner, casters 440 may be replaced one at a time. In another embodiment, the shaft 116 is moved by employing a conventional hydraulic or mechanical jack. The jack can be removed once a caster 440 is replaced and the one or more adjustable casters are tensioned to firmly hold the shaft 116 in position. The shaft 116 typically runs radially through the central axis of the drum 104. The casters 440 can be replaced without "dismasting" or removing the shaft 116 and without removing other casters 440.

Figure 14:
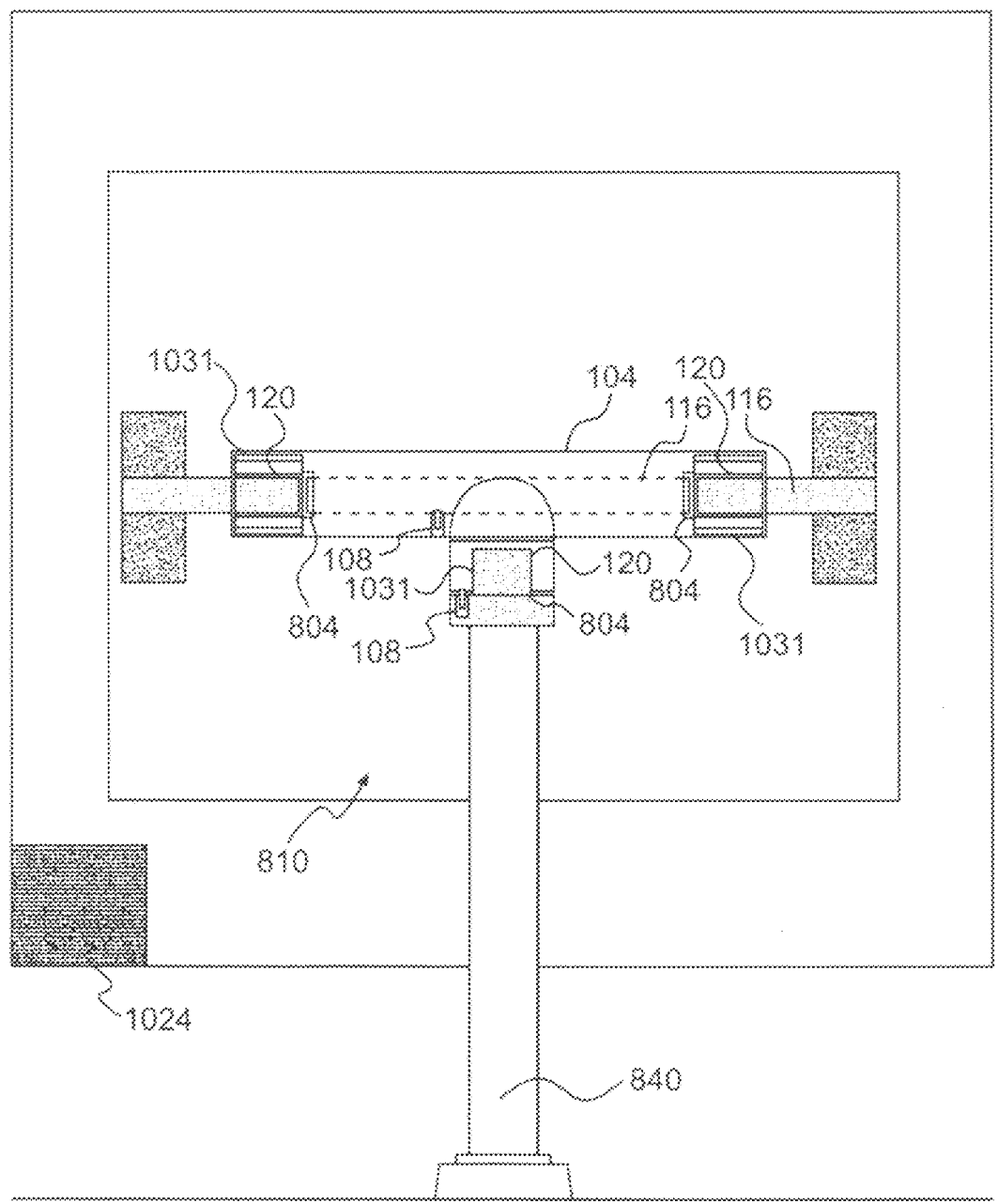
FIG. 14 shows a perspective view of three embodiments of the system for moving an object in one axis arranged to provide multi-axis tracking, with the object moved to a full-range elevation position perpendicular to the ground.

Referring now to FIG. 14, shown is a perspective view of a system 100 acting as an azimuth drive employed to rotate a heliostat mirror application 1031 in a horizontal axis. The object 810 is shown moved to a full-range elevation position perpendicular to the ground. In this embodiment, the system 100 is fixed to a pedestal 840 while the shaft 116 freely rotates within the drum 104. The object 810 is coupled to the shaft 116 which is running axially through the center of the drum 104 and is held in place by one or more rotating assemblies 804. A power supply 1024 is shown on the object 810.

Figure 15:
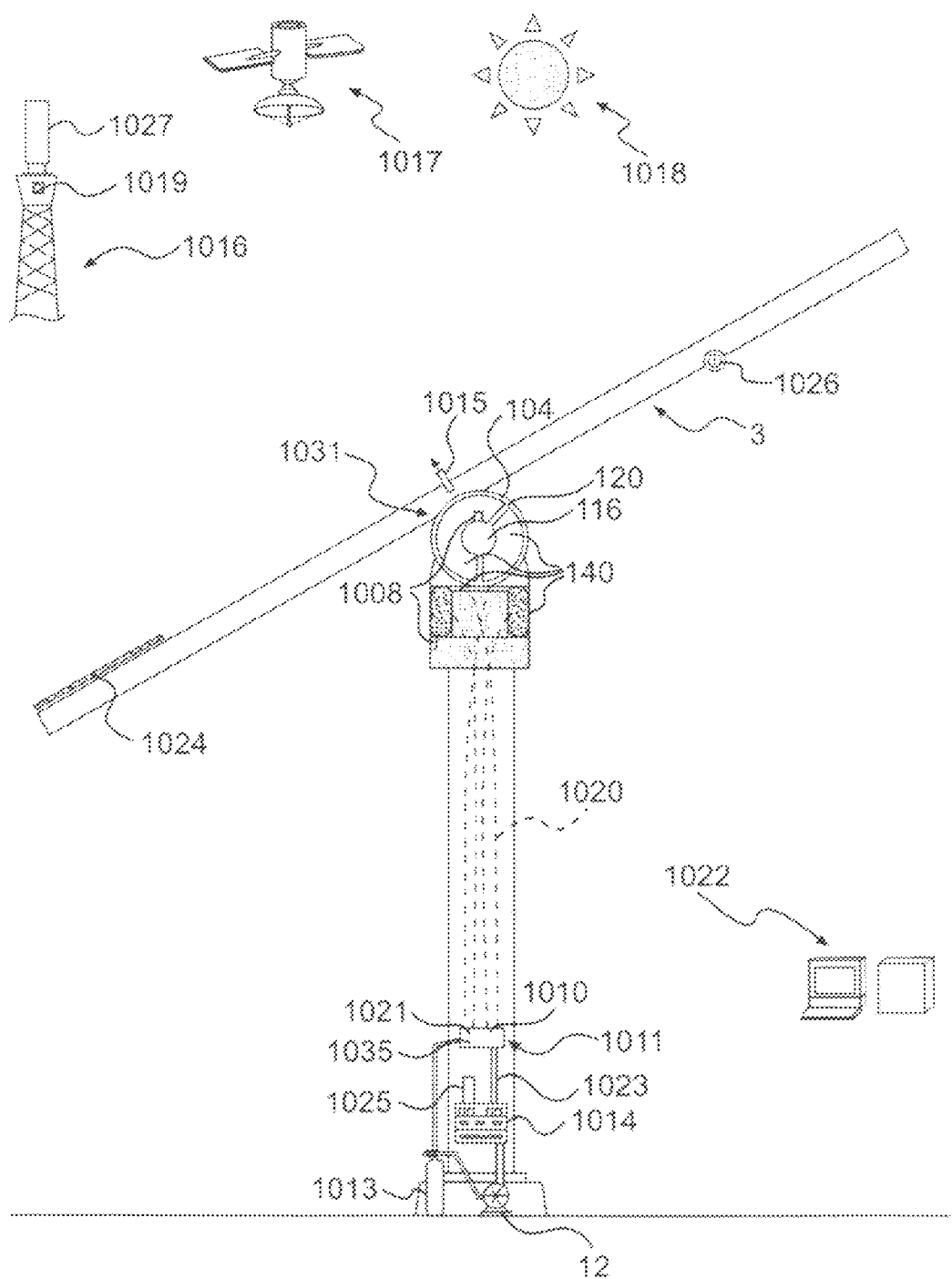
FIG. 15 shows a side view of three embodiments of the system for moving an object in one axis arranged to provide multi-axis tracking with all of the ancillary command and control systems shown.

Referring now to FIG. 15, shown is a side view of a system 100 acting as an azimuth drive employed to rotate a heliostat mirror application 1031 in a horizontal axis. More than one drum 104 may be combined to form a heliostat for multi-axis tracking of the sun with the elevation drive being coupled to the azimuth drive at right angles to one another. The provision of a second elevation drive ensures a fully redundant system for achieving wind stow in the event of a single elevation drive failure. The second elevation drive is optional and may be removed. In this embodiment, the inner shaft 116 is fixed to the pedestal 840 and connected to the drum 104 by a rotating assembly 804 (not shown). The rotating assembly 804 may be a thrust bearing, or a slewing bearing, and a second bearing may be a plain contact, ball or other type of bearing suitable for carrying the weight and forces produced by wind loading on the application or object 810. The vanes 120 may be arranged in the drum 104 to provide a range of motion of slightly more than 180° such that, when coupled to an elevation drive, the heliostat provides full multi axis motion to point the application at any selected point. In an embodiment for each fluid inflatable container 140',140," a coupling may be provided to one or more motorized or computer controlled valve actuators 1011 and control valves 1010 to allow robotic control of the position of the application. This embodiment of system 100 is shown with a locking device, such as a manually or mechatronically deployed drift pin 1008 and a manifold 1035 of air or fluid tubes connected to control valves 1010 for pressurizing and de-pressurizing each fluid containers. This embodiment of the system 100 further includes electronic valve actuators 1011 for activating the control valves 1010, a source of compressed air or other fluid such as a compressor 1012, hoses 1020 to connect the fluid inflatable containers 140',140" to the control valves 1010, compressor 1012, and an optional storage tank for pressurized fluid 1013. The computer 1014, by processing information from the electronic pressure sensors 1021, the ambient temperature sensor 1025, the rotational position encoders (not shown) and/or the electronic level sensors 1026, may calculate the present position of the application, determine the air volume and pressure changes necessary to effect within each fluid inflatable container 140',140" to actuate, drive, or move the object 810 or application to the desired position to maintain optimal orientation with respect to the target. The computer 1014 may then activate the valve actuators 1011 and activate the compressor 1012 or the pressurized fluid storage system 1013 to release compressed fluid into the hoses 1020 attached to those fluid inflatable containers 140',140." The computer 1014 may direct the inflation and deflation of the fluid inflatable containers 140',140" in order to actuate, drive, or otherwise move the object 810 or application to the desired position while simultaneously comparing and correcting the motion of the object 810 by evaluating the feedback obtained from the electronic level sensors 1026 and/or the rotational position encoders (not shown). In some embodiments, these steps or activities do not occur simultaneously but in serial or within an accepted time frame depending upon the industry application.

The system 100 for moving an object in one axis embodied in FIG. 15 may include a laser positioning system as either a primary or secondary guidance system or positioning feedback system. The positioning system shown in this embodiment includes laser emitters 1015 and laser receivers 1019. The object 810 or application is fitted with a laser beam emitter 1015 that emits a laser beam from the object 810 or application surface at a known angle relative to the object 810 or connector 844 (not shown). The laser beam is sensed by a laser sensor 1019 shown positioned at the top of a solar receiver tower 1016. The computer 1014, by processing information electronically received from the laser sensor, may then orient the connector 844 and/or object 810 or application in the most advantageous position for insolating the target, in this case a solar thermal receiver 1027. Also shown are power supplies such as a photovoltaic power source 1024 and cables for the compression and control system 1023. The manifold 1035 may include one or more tubes inside of the larger manifold 35 and electronic pressure sensors 1021 to monitor the pressure within the fluid containers and other parts of the pressurized fluid system. The system 100 further includes level sensors for elevation 1026 (which may be mounted within or on the application or connector 844), electronic rotational position encoders (not shown), an ambient temperature sensor 1025.

Additionally, the system for moving an object in one axis may be deployed in a solar power plant where solar radiation from the sun 1018 is focused on a solar energy receiver 1027, mounted on a solar tower 1016, by an array of heliostats each containing multiple embodiments of the system for moving an object in one axis. These heliostats may include sensors and guidance system such as rotational position encoders (not shown) and computer hardware and software 1014 for directing the actuators and movement as appropriate to the specific application, one or more laser emitters 1015 mounted on the application or solar tower and one or more laser receivers 1019 mounted on the solar tower 1016 and a power supply 1024 which may be a photovoltaic panel or other power source to supply power to the pressurized fluid system, the sensors and guidance systems, and a wireless or wired central array controller 1022.

The computer 1014, by processing information from the electronic pressure sensors 1021, the ambient temperature sensor 1025, the rotational position encoders (not shown) and/or the electronic level sensors 1026, may calculate the present position of the application, determine the fluid volume and pressure changes necessary to effect within each fluid inflatable container to actuate, drive, or move the object or application to the desired position to maintain optimal orientation with respect to the target. The computer may then activate the valve actuators 1011 and activate the compressor 1012 or the pressurized fluid storage system 1013 to release compressed fluid into hoses attached to those fluid inflatable containers 140',140" that need to inflate and simultaneously release fluid out of those fluid inflatable containers that need to deflate in order to actuate or drive or otherwise move the object or application to the desired position while simultaneously comparing and correcting the motion of the object 810 by evaluating the feedback obtained from the electronic level sensors 1026 and/or the rotational position encoders (not shown). In some embodiments, these steps or activities do not occur simultaneously but in serial or within an accepted time frame depending upon the industry application. The software routine also processes input from a wind sensor.

Generally, there will be one fluid hose source per fluid inflatable container 140',140" or sealed sub chamber therein. The manifold 1035 in an embodiment will usually have a pressure transducer port, an exhaust valve port and an inflation valve port. A single three-port valve could provide inflation and deflation with half the valves (1 valve per container). Examples of suitable valves that may be used in an embodiment are twelve-volt solenoid actuated fluid valves and three-way servo actuated fluid valves. Closed or open inflation systems may be used. Embodiments may be based on excess fluid upon deflation being bled into the atmosphere or being bled from one container into another or into a holding tank. Applications using liquid fluids, or used in the upper atmosphere, space, and underwater applications may need to reuse all available fluid in a closed system.

The system 100 for moving an object in one axis is able to provide highly dispersed but precisely controlled mechanical force to cause movement and precision positioning through the differential systematic pressurization and depressurization of the fluid inflatable containers 140',140." To perform their function, the fluid inflatable containers 140',140" require modest pressure, depending among other factors on the size of the application to be moved, external forces impinging on the application that must be countered (such as maximum wind load), the number of fluid inflatable containers 140',140" and the fluid inflatable container 140',140" surface contact area on the vanes 120 within the drum 104. In many applications or installations, a pressure range of approximately 8 psi to 150 psi, may be used. The compressor may be coupled to a pressurized fluid storage container 1013 which allows the run time of the compressor to be reduced and provides a reserve supply of pressurized fluid for operation at low power during periods of external power interruption.

The fluid inflatable containers 140',140" are unaffected by normal and abnormal external stresses, vibration, or shaking applied to the object or application during operation. The force of pressure inside the fluid inflatable containers 140', 140" is magnified by the surface area over which the fluid inflatable containers 140',140" apply force against the vanes 120 to move the object 810, and this distributed force allows them to easily absorb inertia or momentum created by the object itself (which may be exceedingly heavy and massive, far more massive than with current actuators) or exerted by externalities acting upon the object. The fluid inflatable containers 140',140" may be made of almost any of multiple conventional expandable or non-expandable inflatable materials, from natural or synthetic elastomers such as rubber or silicone, to coated nylon fabrics typical of "Zodiac" pontoon boats to coated fabric bladders typically used for fuel cells in auto racing, aviation, and in shipping for ballast and dunnage. In higher pressure applications, the fluid inflatable containers 140',140" may be made of higher strength composites such as rubber coated woven aramid fibers.

In an embodiment, the object 810 being moved is counterbalanced by a weight. This weight may be placed on the opposite side of the drum 104 and shaft 116 from the object 810. The counterbalance or weight may be used to reduce the amount of force needed to move the object. Ultimately, the weight can be used to bias the system 100 or object into a stowed position in the event of a failure of the fluid system.

With continuing reference to FIG. 15, the system 100 for moving an object in one axis may be stabilized in a stow or other desired position by means of a drift pin 1008 which will positively lock the system in position during installation or any period when the parts of the system 100 for moving an object in one axis are removed or replaced and the object 810 or has no fluid inflatable containers 140',140" control its position. In embodiments that use an elastic tensioning device such as a coiled torsion spring 700',700" or clock spring 710', 710", the elastic tensioning device may have sufficient preload torque to hold the object 810 in position without the need for a drift pin 1008.

The system 100 may move an object or application in a stop-and-go fashion or in a continuous, smooth motion. The system 100 therefore can operate without using or requiring a stepping function, unlike electric stepper motors. The system 100 can easily withstand sudden stops and changes in momentum of even heavy applications without damage to the system, since the mechanism naturally disperses and absorbs shocks as elastic rather than inelastic impacts or collisions.

Figure 16:
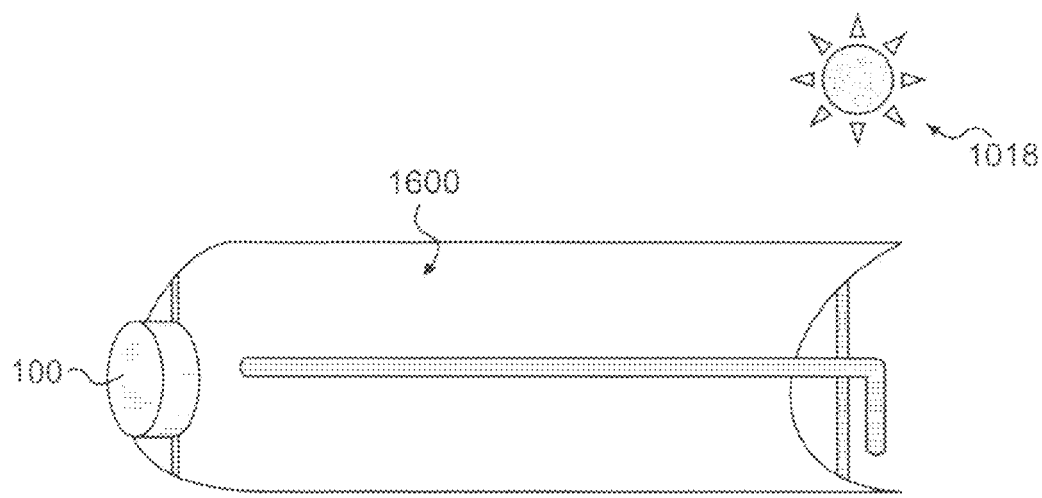
FIG. 16 shows a perspective view of an embodiment of the system for moving an object in one axis arranged to provide single axis tracking for a parabolic solar collecting trough.

Referring now to FIG. 16, shown is a perspective view of the system 100 for moving an object in one axis arranged to provide single axis tracking for a solar collecting trough 1600 by tracking the sun's apparent motion across the sky during the course of a day.

Figure 17:
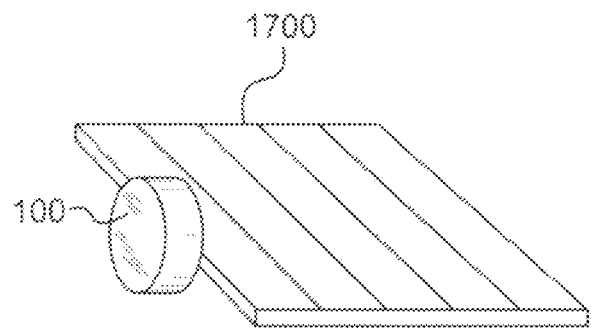
FIG. 17 shows a perspective view of an embodiment of the system for moving an object in one axis arranged to provide single axis tracking for a solar photovoltaic panel.

Referring now to FIG. 17, shown is a perspective view of the system 100 for moving an object in one axis arranged to provide single axis tracking for a solar photovoltaic panel 1700 to increase the efficiency of the panel by tracking the Sun's 1018 apparent motion across the sky during the course of a day.

Figure 18:
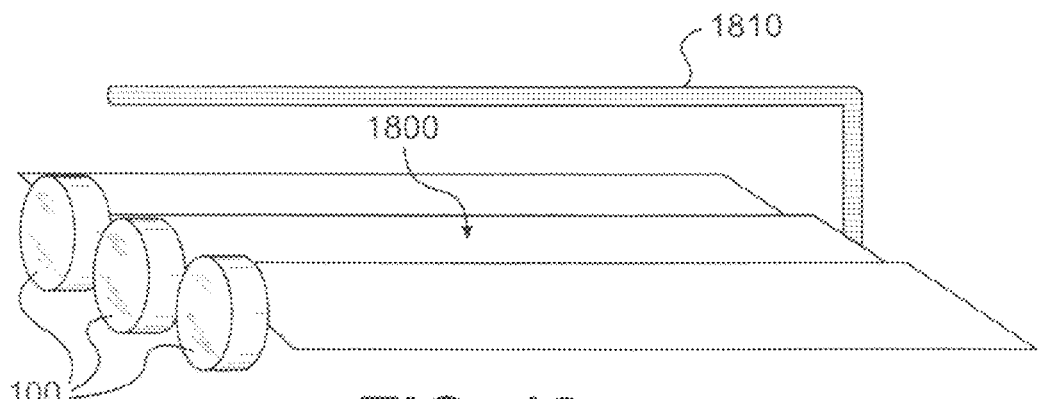
FIG. 18 shows a perspective view of an three embodiments of the system for moving an object in one axis arranged to provide single axis tracking for a Fresnel solar collecting trough.

Referring now to FIG. 18, shown is a perspective view of three systems 100 for moving an object in one axis arranged to provide single axis tracking to a single flat mirror segment 1800. The sun's energy is concentrated onto a fixed receiver pipe 1810 in a Fresnel type trough solar collector.

Figure 19:
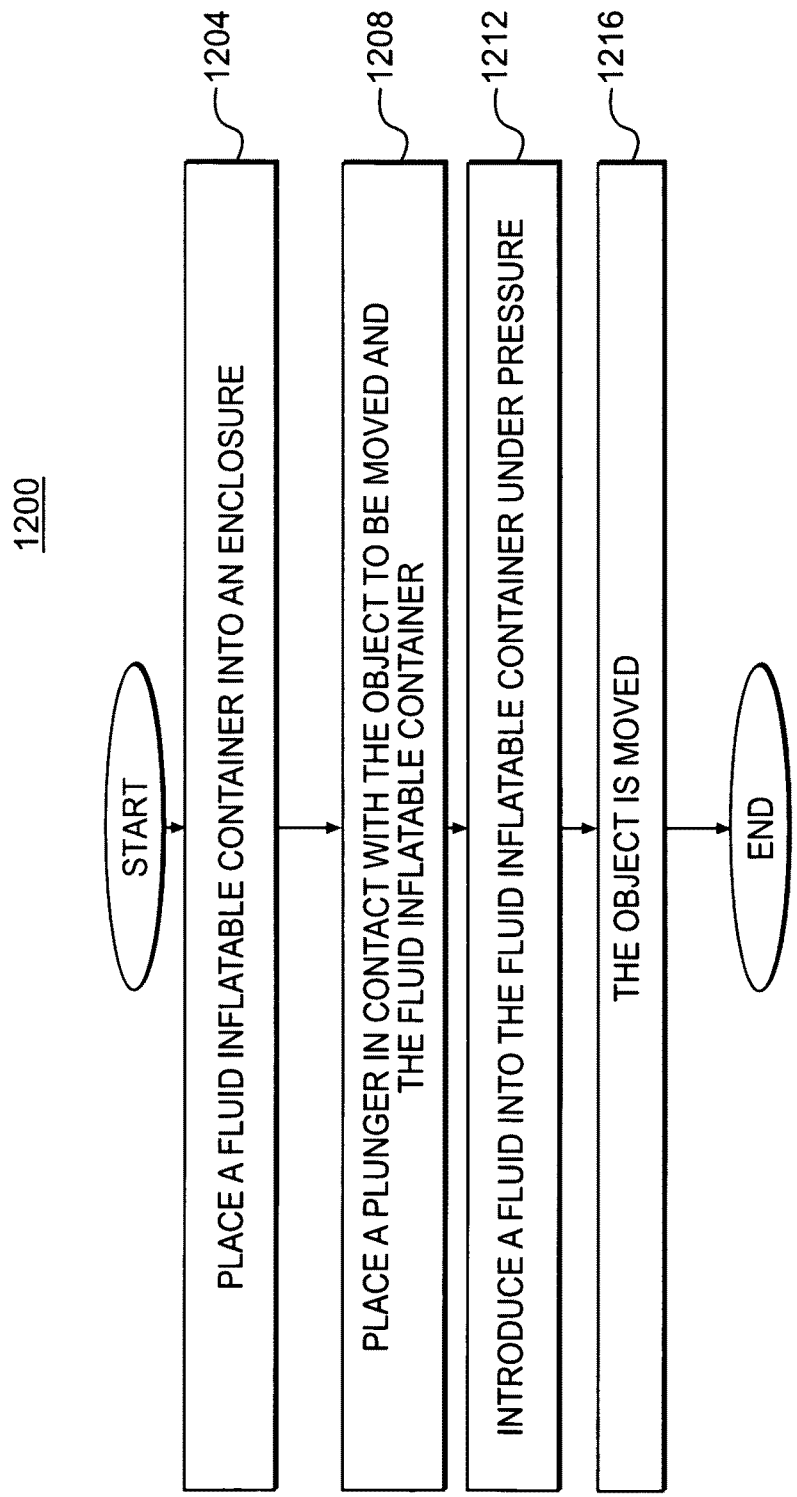
FIG. 19 illustrates a flow-chart of a method for non-linear actuation of an object.

Referring now to FIG. 19, shown is a flow chart illustrating a method 1200 for non-linear movement of an object. The method 1200 is practiced by placing a fluid inflatable container 140',140" into an enclosure sufficient to contain the force exerted by the pressure of the fluid inflatable container 140',140" (1204). In an embodiment, the curvature of the enclosure is similar to the curvature of the non-linear motion desired. The method 1200 further includes placing a plunger 124',124" in contact with the object to be moved and the fluid inflatable container 140',140" (1208). The plunger 124',124" has a tapered shape similar to but smaller than the enclosure in contact with the fluid inflatable container 140',140." By introducing a fluid into said fluid inflatable container 140', 140" under pressure (1212), the object is moved (1216). Additional containers and plungers 124',124" may be added to the non-linear actuator system. In most embodiments an even number of fluid inflatable containers 140',140" each fluid inflatable container 140',140" opposed by another are used, for example, 2, 4, 6, 8. In most embodiments, there is a plunger 124',124" corresponding to each fluid inflatable container 140',140." As discussed earlier, double connected plungers may be used.

Figure 20:
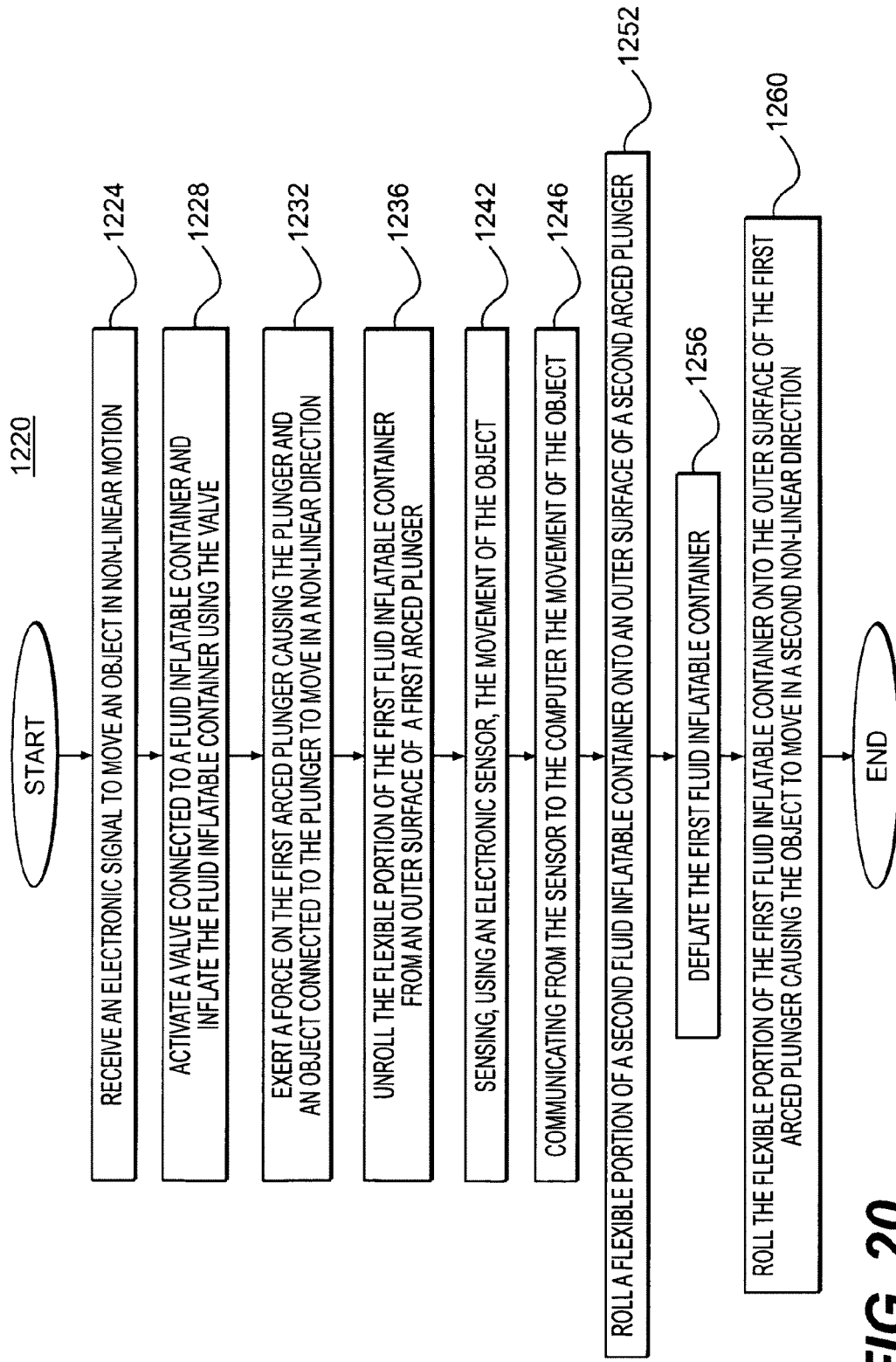
FIG. 20 illustrates a flow-chart of a method for repeatable non-linear actuation of an object using electronic sensors and processors.

Referring now to FIG. 20, shown is a flow chart illustrating a method 1220 for repeatable non-linear actuation of an object 810 using electronic sensors and processors to control the non-linear actuator system 100. In this embodiment, the object 810 may be moved in opposing non-linear directions. The method 1220 includes receiving, at a computer, an electronic signal to move an object in non-linear motion and processing the signal (1224). The method 1220 further includes electronically activating a valve connected to a first fluid inflatable container 140',140" using the computer and inflating the first fluid inflatable container 140',140" having a flexible portion using the activated valve (1228). The step of exerting a force on the first arced plunger 124',124" (1232) causes the first arced plunger 124',124" to move away from the fluid inflatable container 140',140" and towards a movable vane 120. The plunger 124',124" moves in a non-linear direction and moves the movable vane 120. An object connected to the movable vane 120 moves in a first non-linear direction. The method 1220 includes unrolling the flexible portion of the first fluid inflatable container 140',140" from an outer surface of a first arced plunger 124',124" (1236). The method 1220 further includes sensing, using an electronic sensor, the movement of the object (1242) and communicating from the sensor to the computer the movement of the object (1246). The method 1220 includes rolling a flexible portion of a second fluid inflatable container 140',140" onto an outer surface of a second arced plunger 124',124" (1252). Also, the method includes the steps of reversing and repeating the movements. The method includes the step of deflating the first fluid inflatable container 140',140" under computer control (1256). The method 1220 further includes rolling the flexible portion of the first fluid inflatable container 140',140" onto the outer surface of the first arced plunger 124',124" causing the object to move in a second non-linear direction. Thus, the object can be returned to its original position.

The method for repeatable non-linear actuation of an object 810 (method 1220 shown in FIG. 20) can be modified for use in a system 100 including a torsion spring, one fluid inflatable bladder 140 and one plunger 124 (as in FIGS. 9A-9C). In these embodiments, the method 1220 further includes storing the energy used to inflate the fluid container in a torsion spring such as a spiral or clock spring operatively connected to the movable vane 120.

Various processors, memories, chip sets, software and computers may be used to control and/or monitor the actuator and actuator systems. Various electronic and mechanical sensors may also be used with the actuator and actuator systems. These are described in PCT application number PCT/US2008/006660, filed May 23, 2008, and PCT application number PCT/US2009/000825 filed Feb. 18, 2009, both commonly owned and are fully incorporated herein by reference as if set out in their entirety. Various computer configurations are possible in systems with multiple non-linear actuators.

In the foregoing detailed description, systems and methods in accordance with embodiments of the system 100 for moving an object in one axis are described with reference to specific exemplary embodiments. Accordingly, the present specification and figures are to be regarded as illustrative rather than restrictive. The scope of the system 100 for moving an object in one axis is to be further understood by the numbered examples appended hereto, and by their equivalents.

Further, in describing various embodiments, the specification may present a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. Also, steps may be skipped or by-passed. In addition, the claims directed to the method and/or process should not be limited to the performance of their steps in the order written, and one skilled in the art may readily appreciate that the sequences may be varied and still remain within the spirit and scope of the various embodiments.

The invention claimed is:

1. An arced actuator to move a photovoltaic panel or solar reflecting mirror in a repeatable arced motion comprising:
   a movable member connected to the photovoltaic panel or solar reflecting mirror;
   a housing operably connected to the movable member with a caster assembly;
   a first plunger attached to the movable member and having a curved mid-portion along a longitudinal axis;
   a second plunger;
   a first fluid inflatable container constrained by the housing wherein the first plunger is engaged by the first fluid inflatable container, wherein a portion of the first fluid inflatable container is rolled onto a concave surface of the first plunger forming a rolling lobe, wherein the rolling lobe is adjacent the concave surface and circumscribes the mid-portion;
   a second fluid inflatable container constrained by the housing wherein the second plunger is engaged by the second fluid inflatable container;
   one or more control valves operably connected to the first fluid inflatable container;
   one or more control valves operably connected to the second fluid inflatable container;
   an electronic pressure sensor connected to the first fluid inflatable container;
   electronic actuators for the one or more control valves connected to the first fluid inflatable container for pressurizing and de-pressurizing the first fluid inflatable container;
   electronic location sensor for determining a location of the photovoltaic panel or solar reflecting mirror; and
   a computer, having a processor and a memory, that controls motion of the photovoltaic panel or solar reflecting mirror by electronically actuating the one or more control valves in response to signals received from the electronic pressure sensor and the electronic location sensor and communicates output values of the electronic pressure sensor and the electronic location sensor, and positions of the one or more control valves through electromagnetic signals,
   wherein the inflation of the first fluid inflatable container causes the first plunger and second plunger to move in a non-linear motion in the direction of the second fluid inflatable container.

2. The arced actuator of claim 1 wherein a rolling lobe is created by the second fluid inflatable container.

3. The arced actuator of claim 1 wherein the movable member is a shaft.

4. The arced actuator of claim 1 wherein the housing is a drum.

5. The arced actuator of claim 1 wherein the housing is operably connected to the movable member with one of bearings or a track.

6. The arced actuator of claim 1 wherein the second plunger is arced in shape.

7. The arced actuator of claim 1 wherein the first and second plungers are connected.

8. The arced actuator of claim 1 wherein the first fluid inflatable container has a flexible portion.

9. The arced actuator of claim 1 wherein the second fluid inflatable container has a flexible portion.

10. The arced actuator of claim 1 wherein the second plunger has a curved exterior surface and the second fluid inflatable containers rolls onto the curved exterior surface.

11. The arced actuator of claim 1 wherein the first plunger has a curved exterior surface and the first fluid inflatable containers rolls onto the curved exterior surface.

12. The arced actuator of claim 1 wherein the fluid inflatable containers are filled with hydraulic fluid.

13. The arced actuator of claim 1 wherein the first plunger comprises a polymer.

14. A system for moving a photovoltaic panel or solar reflecting mirror about one axis, comprising:
   a support structure;
   a cylindrical drum operatively connected to the support structure;
   a shaft running axially through the center of the drum, the shaft operatively connected to the photovoltaic panel or solar reflecting mirror;
   one or more supports for the shaft such that the shaft may turn freely within the drum, wherein the supports comprise bearings including three or more casters mounted directly or indirectly on the drum for supporting the shaft and allowing the shaft to freely rotate within the drum;
   a shaft vane fixed to the shaft, running longitudinally along the shaft and extending radially to the inner wall of the drum;
   a drum vane fixed to the drum, running longitudinally along the inner wall of the drum and extending radially towards the outer surface of the shaft;
   two fluid inflatable containers placed inside the drum between the shaft vane and the drum vane such that expansion of one of the two fluid inflatable containers exerts force simultaneously upon the shaft vane and the drum vane;

two plungers each having two ends that are non-adjacent and a mid-portion extending between the two ends, each of the mid-portions having an arced exterior surface, each of the two plungers connected to one of the drum vane or the shaft vane, wherein a rolling lobe is formed by each of the fluid inflatable containers on the arced exterior surface of the plungers and circumscribes the mid-portion;

one or more control valves, operatively connected to the fluid inflatable containers, for pressurizing each of the fluid inflatable containers;

a source of compressed fluid connected operatively to each of the one or more control valves for pressurizing each of the fluid inflatable containers; and wherein one of the shaft vane or drum vane moves in a radial direction in response to the exerted force and moves the photovoltaic panel or solar reflecting mirror.

15. The system of claim 14, wherein each caster is adjustable for creating a tolerance between the castor and shaft and each castor is mounted to the drum with one or more bolts.

* * * * *